United States Patent
Chai et al.

(10) Patent No.: US 8,392,717 B2
(45) Date of Patent: Mar. 5, 2013

(54) AUTHENTICATION METHOD, SYSTEM, SERVER, AND CLIENT

(75) Inventors: Xiaoqian Chai, Shenzhen (CN); Hongtao Gao, Shenzhen (CN); Kepeng Li, Shenzhen (CN); Linyi Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 263 days.

(21) Appl. No.: 12/775,937

(22) Filed: May 7, 2010

(65) Prior Publication Data

US 2010/0217997 A1  Aug. 26, 2010

Related U.S. Application Data

(63) Continuation of application No. PCT/CN2008/070686, filed on Apr. 9, 2008.

(30) Foreign Application Priority Data

Nov. 8, 2007  (CN) .......................... 2007 1 0170309
Nov. 27, 2007  (CN) .......................... 2007 1 0195462

(51) Int. Cl.
*H04L 9/32* (2006.01)

(52) U.S. Cl. ........ 713/181; 713/150; 713/168; 713/194; 380/259; 380/274; 726/4; 726/7; 726/8; 375/355; 375/376

(58) Field of Classification Search .................. 726/4, 7, 726/8; 713/168, 181, 194, 150; 380/259, 380/274; 455/404.1, 414.1, 414.2; 375/355, 375/376

See application file for complete search history.

(56) References Cited

U.S. PATENT DOCUMENTS

| | | | |
|---|---|---|---|
| 6,058,480 | A | 5/2000 | Brown |
| 6,064,736 | A * | 5/2000 | Davis et al. .................... 713/155 |
| 6,480,957 | B1 | 11/2002 | Liao et al. |
| 7,421,733 | B2 | 9/2008 | Glassman et al. |
| 7,549,048 | B2 | 6/2009 | Freeman et al. |
| 7,813,714 | B2 | 10/2010 | Laursen et al. |
| 2002/0196935 | A1 | 12/2002 | Wenocur et al. |
| 2003/0115464 | A1 | 6/2003 | Nyang et al. |
| 2004/0111615 | A1 | 6/2004 | Nyang et al. |

(Continued)

FOREIGN PATENT DOCUMENTS

| | | |
|---|---|---|
| CN | 1476709 A | 2/2004 |
| JP | 2005-5778 | 1/2005 |

(Continued)

OTHER PUBLICATIONS

First U.S. Office Action dated Dec. 8, 2011, issued in related U.S. Appl. No. 13/270,579, filed Oct. 11, 2011 for Huawei Tech Co Ltd.

(Continued)

*Primary Examiner* — Thanhnga B Truong

(57) ABSTRACT

An authentication method is disclosed herein. The method includes: by a server, using a Trigger message nonce to generate a Trigger message, and sending the generated Trigger message to a client so that the client can extract the Trigger message nonce; after determining that the Trigger message nonce is valid, using the Trigger message nonce to generate a digest, and authenticating the Trigger message generated by using the Trigger message nonce; after the authentication succeeds, sending a session request to the server indicated by the Trigger message, where the session request carries a session ID. The corresponding system, server and client are disclosed herein. The present invention makes the authentication process more secure through the client and the server based on the DS or DM protocol.

4 Claims, 9 Drawing Sheets

U.S. PATENT DOCUMENTS

| | | | |
|---|---|---|---|
| 2004/0225881 A1 | 11/2004 | Walmsley et al. | |
| 2005/0120248 A1* | 6/2005 | Medvinsky | 713/201 |
| 2006/0174103 A1 | 8/2006 | Verma et al. | |
| 2007/0044143 A1 | 2/2007 | Zhu et al. | |
| 2007/0106892 A1 | 5/2007 | Engberg | |
| 2008/0072043 A1 | 3/2008 | Lee | |
| 2009/0267730 A1 | 10/2009 | Zhang | |

FOREIGN PATENT DOCUMENTS

| | | |
|---|---|---|
| WO | WO02/25899 A1 | 3/2002 |
| WO | WO 02/25899 A1 | 3/2002 |

OTHER PUBLICATIONS

OMA-TS-DM_Notification-V1_2-20070209-A, OMA Device Management Notification Initiated Session, Approved Version 1.2, Open Mobile Alliance, Feb. 9, 2007.

OMA-TS-DM_Security-V1_2-20070209-A, OMA Device Management Security, Approved Version 1.2, Open Mob ile Alliance, Feb. 9, 2007.

OMA-TS-DS_Notification-V2_0-20071025-D, OMA DS Notification, Draft Version 2.0, Oct. 25, 2007.

OMA-TS-DS_Protocol-V2_0-20070827-D, DS Protocol, Draft Version 2.0, Aug. 27, 2007.

English Translation of the Written Opinion of the International Searching Authority (translation) dated (mailed) Aug. 21, 2008, issued in related Application No. PCT/CN2008/070686, filed Apr. 9, 2008, Huawei Technologies Co., Ltd.

Wang, et al., "Attack on 4-way Handshake of 802.11i", Computer Science and Technology School, Computer and Modernization, ISSN 1006-2475, No. 5, pp. 72-75, (May 2006).

Shi, et al., "Design and analysis of a wireless authentication protocol against DoS attacks based on Hash function", System Engineering and Electronics, Aerospace Electronics Information Engineering and Control, vol. 28, No. 1, pp. 122-126, (Jan. 2006).

International Search Report from P.R. China in International Application No. PCT/CN2008/070686 mailed Aug. 21, 2008.

Russian Office Action dated (mailed) Jul. 1, 2011, issued in related Russian Application No. 2010123182 Huawei Technologies Co., LTD.

Lau, J. et al. Layer Two Tunneling Protocol—Version 3 (L2TPv3), The Internet Society, Mar. 2005.

Extended European Search Report issued in related application EP08734046.9, dated Oct. 28, 2011.

* cited by examiner

AUTHENTICATION METHOD, SYSTEM, SERVER, AND CLIENT

CROSS-REFERENCE TO RELATED APPLICATIONS

This application is a continuation of International Application No. PCT/CN2008/070686, filed on Apr. 9, 2008, which claims priority to Chinese Patent Application No. 200710170309.5, filed on Nov. 8, 2007 and Chinese Patent Application No. 200710195462.3, filed on Nov. 27, 2007, all of which are hereby incorporated by reference in their entireties.

FIELD OF THE INVENTION

The present invention relates to communication technologies, and in particular, to an authentication method based on a Data Synchronization (DS) protocol and a Device Management (DM) protocol, and to a system, a server, and a client.

BACKGROUND

Synchronization Mark-up Language (SyncML) is a protocol developed to synchronize personal information and intra-enterprise data between multiple platforms and networks. The SyncML protocol defines a series of operations between the participating entities, and defines a set of message formats for carrying such operations. Based on the SyncML, the Open Mobile Alliance (OMA) develops the DS protocol and the DM protocol.

The DS protocol can synchronize personal information and intra-enterprise data between multiple platforms and networks. The DS protocol is generally applied to data synchronization between a mobile device or application server and a network server, or data synchronization between two Personal Computers (PCs).

The DM protocol is a cost-efficient remote management solution that downloads management instruction data from the network to the client, and lets the client run the management instruction automatically to upgrade, configure and diagnose the software and hardware of the client. The DM also transfers the service information required by the operator and the information about the functions of the client from the client to the server, thus supporting operation of other services.

A similar security authentication mechanism is applied to the DS protocol and the DM protocol to authenticate the server and the client effectively, as shown in FIG. 1:

Step 101: The server sends a Trigger message to the client to trigger a session.

The Trigger message carries: a Digest generated by using a random number of the server (s_nonce), and trigger information (TriggerInfo). The Trigger message may be carried in a short message or another Push message.

The s_nonce is a random number (nonce) generated by the client and available to the server.

Step 102: The client sends a session request to the server.

After receiving the Trigger message, the client uses the stored s_nonce to generate Digest information and authenticate the Trigger message. If the authentication succeeds, the client sends a session request to the server to initiate a session.

The session request carries: a SessionID, and authentication information (Authenticate) of the client. The authentication information is a Digest generated by using the client nonce (c_nonce).

The c_nonce is generated by the server and available to the client.

In this step, a session connection is set up between the client and the server.

Step 103: The server returns a response that carries the authentication result and the authentication request.

According to the authentication information sent by the client, the server authenticates the client, and then returns a response that carries the authentication result and the server authentication request.

More specifically, the response carries: a result of the server authenticating the client, a SessionID, and authentication information of the server (namely, a Digest generated by using the s_nonce).

Step 104: The client returns a message that carries the authentication result to the server.

According to the authentication information sent by the server, the client authenticates the server, and then returns a message that carries the authentication result to the server.

More specifically, this message carries: a result of the client authenticating the server, and other relevant information.

If the server authenticates the client unsuccessfully or the client authenticates the server unsuccessfully, for example, the password is incorrect or the nonce value is incorrect, the server or the client may send a challenge request to the opposite party directly to authenticate again.

If the server knows that the s_nonce used in the Trigger message is incorrect, for example, if the server receives no normal response from the client after sending the Trigger message repeatedly, the server believes that the s_nonce is incorrect, and generates the Digest of the Trigger message by using a default nonce "0x00000000". After authenticating the Trigger message unsuccessfully according to the Digest generated by using the s_nonce, the client uses the default nonce to generate a Digest and re-authenticate the Trigger message. If the authentication succeeds, the default nonce is used to authenticate the server and the client, and then the s_nonce and the c_nonce are updated. The update process is shown in FIG. 2:

Step 201: The server sends a Trigger message to the client to trigger a session.

After determining that the previous s_nonce is incorrect, the server uses the default nonce to generate a Trigger message and sends the message to the client. The Trigger message carries: Digest generated by using the default nonce, and TriggerInfo.

Step 202: The client authenticates the Trigger message unsuccessfully, and uses the default nonce to re-authenticate.

After receiving the Trigger message, the client uses the stored s_nonce to authenticate the Trigger message. If the authentication fails for certain reasons, the client uses the default nonce to re-authenticate the Trigger message.

If the authentication succeeds, it indicates that the s_nonce previously used by the server is incorrect, and the client sends a session request to the server.

Step 203: The client sends a session request to the server.

After authenticating successfully by using the default nonce, the client sends a session request to the server to initiate a session.

The session request carries: SessionID, and Digest generated by using the default nonce.

Step 204: The server returns a response that carries the authentication result, the authentication request, and the command for updating c_nonce.

The server authenticates the client by using the default nonce, and then returns a response that carries the authentication result and the authentication request to the client.

More specifically, the response carries: a result of the server authenticating the client, a command for updating c_nonce, and a Digest generated by using the default nonce.

Step 205: The client returns a message that carries the authentication result and the command for updating s_nonce to the server.

The client authenticates the server by using the default nonce. After the authentication succeeds, the client updates the c_nonce, and then returns a message that carries the authentication result and the command for updating s_nonce to the server.

Step 206: The server returns an s_nonce update result to the client.

In the process of developing the present invention, the inventor finds at least the following defects in the prior art:

The default nonce is used to authenticate in the case that the s_nonce is incorrect. The default nonce is an open fixed value, and the malicious server can intercept the message that uses the default nonce and send the message repeatedly to attack the server or client.

In the prior art, two nonce values are used in one session: s_nonce and c_nonce, which are generated and updated by the server and the client respectively, thus imposing a heavy management load onto the client and the server.

SUMMARY

The embodiments of the present invention provide an authentication method, a system, a server, and a client based on a DS protocol or DM protocol to optimize the authentication process that is performed between the client and the server and based on the DS or DM protocol.

The authentication method based on the DS or DM protocol in an embodiment of the present invention includes:

by a server, using a Trigger message nonce to generate a Trigger message, and sending the generated Trigger message to a client so that the client can extract the Trigger message nonce;

after determining that the Trigger message nonce is valid, using the Trigger message nonce to generate a digest, and authenticating the Trigger message generated by using the Trigger message nonce; and after the authentication succeeds, sending a session request to the server indicated by the Trigger message, where the session request carries a session ID.

Another authentication method based on the DS or DM protocol in an embodiment of the present invention includes:

by a client, receiving a Trigger message that is sent by a server and generated by using a default nonce;

using a server nonce to authenticate the Trigger message after receiving the Trigger message; if the authentication fails, using the default nonce to authenticate the Trigger message; after the authentication succeeds, using the default nonce to generate a session request and set up a session; sending a new server nonce in the session to the server so that the server updates the server nonce; receiving authentication information that is sent by the server and generated by using a default nonce to authenticate the server; and receiving a command of updating the client nonce from the server to update the client nonce; and updating a server password and a client password after updating the server nonce and the client nonce.

Another authentication method based on the DS or DM protocol in an embodiment of the present invention includes:

by a client, sending a session request to a server, where the session request is generated by using a default nonce;

by the server, after receiving the session request, using the default nonce to authenticate the session request if determining that the authentication is required, and returning a response to the client after the authentication succeeds, where the response carries an authentication result, an authentication request generated by using the random nonce, and a command of updating the client nonce; and by the client, receiving the response, using a default nonce to authenticate the response if determining that the authentication is required, and returning a response to the server after the authentication succeeds, where the response carries an authentication result and a command of updating the server nonce.

The server provided in an embodiment of the present invention includes:

a first generating unit, adapted to use a Trigger message nonce to generate a Trigger message compliant with the DS or DM protocol; and a sending unit, adapted to: send the Trigger message generated by using the Trigger message nonce to the client so that the client can extract the Trigger message nonce; after determining that the Trigger message nonce is valid, use the Trigger message nonce to authenticate the Trigger message generated by using the Trigger message nonce; after the authentication succeeds, send a session request to the server indicated by the Trigger message.

The client provided in an embodiment of the present invention includes:

a receiving unit, adapted to receive a Trigger message that is generated by a server by using a Trigger message nonce and compliant with a DS or DM protocol; and a first authenticating unit, adapted to: extract the Trigger message nonce; after determining that the Trigger message nonce is valid, use the Trigger message nonce to generate a digest, and authenticate the Trigger message generated by using the Trigger message nonce; after the authentication succeeds, send a session request to the server indicated by the Trigger message.

g

Another client provided in an embodiment of the present invention includes:

a receiving unit, adapted to receive a Trigger message that is generated by a server by using a Trigger message nonce and compliant with a DS or DM protocol; and a generating unit, adapted to: use a server nonce to authenticate the Trigger message after receiving the Trigger message; if the authentication fails, use the default nonce to authenticate the Trigger message; after the authentication succeeds, use a client nonce to generate a session request and send the session request to the server so that the server can use the client nonce to authenticate the client.

The foregoing technical solution improves the system security effectively.

Another authentication method based on the DS or DM protocol in an embodiment of the present invention includes:

by a client, receiving a Trigger message sent by a server;

extracting authentication information carried in the received Trigger message, and authenticating the server;

using a nonce shared by the server and the client to generate a session request after the authentication succeeds, and sending the session request to the server;

by the server, using the shared nonce to authenticate the client after receiving the session request; and by the client, using the shared nonce to authenticate the server after receiving a response from the server, where the response carries authentication information generated by using the shared nonce.

Through the foregoing technical solution, the server and the client share a nonce in the session process in place of the s_nonce and the c_nonce in the prior art to implement the authentication between the client and the server, thus relieving the system load effectively.

DETAILED DESCRIPTION

The embodiments of the present invention provide an authentication method based on a DS protocol or DM protocol, a system, a server, and a client to optimize the authentication process that is performed between the client and the server and based on the DS or DM protocol.

The security mechanism applied to the message authentication in a session mentioned herein is an application layer security mechanism.

In the authentication method in Embodiment 1 of the present invention, the server generates a nonce for the Trigger message, where the nonce is different from the s_nonce and the c_nonce and available to the Trigger message. The nonce may be called a Trigger message nonce. The server uses this nonce to generate authentication information, and sends the new nonce and the authentication information together with the Trigger message to the client. The client uses the new nonce to authenticate the Trigger message.

Figure 3:
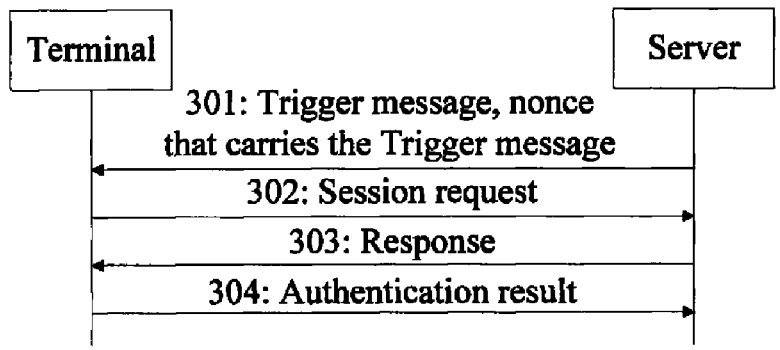
FIG. 3 is a flowchart of an authentication method in Embodiment 1 of the present invention.

As shown in FIG. 3, the authentication method in Embodiment 1 of the present invention includes the following steps:

Step 301: The server sends a Trigger message to the client. The message carries a Trigger message nonce.

Before sending the Trigger message, the server generates a Trigger message nonce, and uses this nonce to generate a Digest, and then uses the Digest to generate a Trigger message.

In this embodiment, there are three types of method of using the Trigger message nonce.

(1) When generating the Trigger message, the server uses its own system time (Ts) as a Trigger message nonce, and adds the Ts into the Trigger message. Therefore, after receiving the Trigger message, the client can determine the validity of the nonce by comparing the local time (Tc) with the system time (Ts). For the nonce, its validity is generally called freshness of the nonce. A fresh nonce is valid, and a non-fresh nonce is invalid.

After receiving the Trigger message, the client calculates the difference between Ts and Tc, namely, |Ts−Tc|. If the |Ts−Tc| is less than a preset threshold "Diff", the Trigger message nonce is valid; if the |Ts−Tc| is not less than a preset threshold "Diff", the Trigger message nonce is invalid.

The threshold Diff is generally configured at the client, and may be an empiric value determined according to the network conditions. Because the mobile network itself is not stable, and tends to generate transmission delay of the Trigger message. Too small thresholds tend to make the Trigger message nonce invalid; if the threshold is too great, in the case that a malicious server intercepts the Trigger message and keeps the message to the client repeatedly, the client regards the messages as valid information and handles them so long as the |Ts−Tc| falls within the threshold range. Greater thresholds are more vulnerable to attacks.

(2) Before generating a Trigger message, the server generates a session ID for the Trigger message first according to certain rules. The rules make it practicable to deduce the previous session ID from the current session ID. The session ID serves as a Trigger message nonce. The server uses the nonce to generate a Digest, and uses the Digest to generate a Trigger message.

After receiving the Trigger message, the client extracts the session ID of the session to be triggered by the Trigger message, and uses this session ID, the server ID, the server password, and other fields of the Trigger message to generate a Digest for authenticating the message. After the authentication succeeds, the client sends a session request to set up the session corresponding to the session ID. The server extracts the session ID from the session request to identify the session.

Further, after the client extracts the session ID of the session to be triggered by the Trigger message, the client may infer the freshness of the session ID according to the coding rules of the session ID; or the client stores the used session IDs, and compares the session ID of the Trigger message with the stored session IDs to determine the freshness.

In this method, the session ID may be replaced by a Trigger message ID (NotificationID). This Trigger message ID associates the Trigger message processing result returned by the client with the Trigger message.

(3) When generating the Trigger message, the server numbers each Trigger message, and uses the number as an exclusive Trigger message nonce. The server uses the nonce to generate a Digest, and uses the Digest to generate a Trigger message.

The number may be in ascending order or descending order. After receiving a Trigger message, the client compares the nonce carried in the message with the stored nonce. In the case that the number is in ascending order, if the new nonce is greater, the nonce is valid; otherwise, it is invalid. In the case that the number is in descending order, if the new nonce is smaller, the nonce is valid; otherwise, it is invalid.

After determining that the new nonce is valid and authenticating the server successfully, the client stores the new nonce, which is available for comparing with the next Trigger message nonce.

In this method, if a malicious server intercepts the Trigger message and attacks the client by sending the message to the client repeatedly, because the nonce used by this Trigger message has been recorded, all malicious messages are determined as invalid, thus preventing attacks from malicious servers.

Further, due to instability of mobile networks, the message sent later may arrive at the client first, and the Trigger messages sent by the server for different sessions may arrive at the client in changed order, and consequently, the client determines the valid messages as invalid messages mistakenly.

For example, the server sends 3 Trigger messages for 3 different sessions consecutively. The Trigger message nonce used by the 3 Trigger messages is 30, 31, and 32 respectively. However, due to instability of mobile networks, the client receives the Trigger message whose nonce is 32 first. Therefore, the client determines this message as valid and records this nonce. When the other two Trigger messages arrive at the client, the client compares their nonce with the recorded nonce. Because their nonce is smaller than the recorded nonce, the client mistakenly determines the messages as invalid.

For such problems, the embodiments of the present invention put forward three solutions:

Solution 1: The client stores all Trigger message nonce values or the last received Trigger message nonce, and compares the Trigger message nonce determined as invalid with the stored nonce. If the nonce is different from the stored nonce, the client determines the nonce as valid and stores the nonce.

When the storage space is limited, a storage space is set, and the stored minimum nonce is deleted when the quantity of stored nonce values reaches the upper limit.

Solution 2: In the case that the Trigger message nonce values are numbered in an ascending order, the client stores the received maximum nonce, and all or part of the nonce values that are smaller than the current maximum value and have not been received; the client compares the Trigger message nonce determined as invalid with the stored nonce values, and, if the nonce is different from the stored nonce values, determines the nonce as valid and stores it. In the case that the Trigger message nonce values are numbered in a descending order, the client stores the received minimum nonce, and all or part of the nonce values that are greater than the current minimum value and have not been received; the client compares the Trigger message nonce determined as invalid with the stored nonce values, and, if the nonce is different from the stored nonce values, determines the nonce as valid and stores it.

For example, it is assumed that the initial value is 1, the numbering mode is ascending order, and the client sequentially receives these Trigger message nonce values: 1, 2, 4, 5, and 7. In this case, the client records the maximum nonce "7" and the nonce values that are smaller than 7 and have not been received, namely, "3" and "6". When the client receives a Trigger message nonce "6", the client compares "6" with the maximum value "7". Because 6 is less than 7, the nonce is invalid. Then, the client compares "6" with "3" and "6" and finds the same value, and therefore, the client determines that the Trigger message nonce is valid, and deletes the recorded "6". In the case that the numbering mode is descending order, the judging method is similar and not repeated here any further.

Solution 3: In the case that the Trigger message nonce values are numbered in ascending order, the client stores the maximum nonce, and regards all Trigger messages whose nonce is less than the stored maximum nonce as invalid. In the case that the Trigger message nonce values are numbered in descending order, the client stores the minimum nonce, and regards all Trigger messages whose nonce is greater than the stored minimum nonce as invalid. If the server receives no response from the client in a time period, the server generates a new nonce according to the numbering rule, and sends the Trigger message that carries the new nonce.

Described above is a method of using a Trigger message nonce in an embodiment of the present invention.

Figure 4:
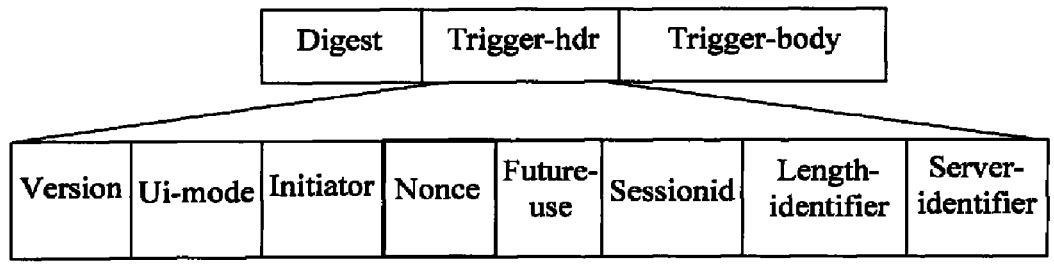
FIG. 4 shows a structure of a message format after a nonce is added.

If the system time or the Trigger message number is used as the Trigger message nonce, the Trigger message nonce may be carried in the message header or message body of the Trigger message. Taking the message header as an example, as shown in FIG. 4, the message format with an added nonce includes: a Digest, a Trigger message header (trigger-hdr), and a Trigger message body (trigger-body).

The trigger-hdr includes: version, user interaction mode (ui-mode), session initiator, nonce, reserved field (future-use), session ID, server identifier length (length-identifier), and server identifier.

In addition, the embodiments of the present invention provide two methods of using a Trigger message nonce to generate a Digest:

Method 1: Let H=MD5 Hashing function and b64=Base64 coding function. The Digest may be expressed as:

$$\text{Digest}=H(B64(H(\text{server-identifier:password})):\text{nonce}:B64(H(\text{trigger}))),$$

where the server-identifier field is a server identifier, the password field is a server password, the nonce field is a Trigger message nonce (namely, system time (Ts) or session ID or Trigger message number mentioned above), and the trigger field includes the trigger-hdr and the trigger-body of the Trigger message.

After receiving the Trigger message and determining that the Trigger message nonce carried in the Trigger message is valid, the client searches the client management tree for the password corresponding to the server. The client uses the found password, the server-identifier in the Trigger message, the nonce, and the Trigger to generate a Digest, and compares the generated Digest with the Digest carried in the message. If the Digest is the same, the authentication succeeds; otherwise, the authentication fails.

Method 2: Let H=MD5 Hashing function and b64=Base64 coding function.

Because the Trigger message nonce is carried in the message header or message body, the nonce becomes a part of the trigger-hdr field and the trigger-body field of the Trigger message. Therefore, for calculating the Digest, only the trigger-hdr field and the trigger-body field need to be used. The Digest may be expressed as:

$$\text{Digest}=H(B64(H(\text{server-identifier: password})):B64(H(\text{trigger}))),$$

where the server-identifier field is a server identifier, the password field is a server password, and the trigger field includes the trigger-hdr and the trigger-body of the Trigger message.

After receiving the Trigger message and determining that the Trigger message nonce carried in the Trigger message is valid, the client searches the client management tree for the password corresponding to the server. The client uses the found password, the server-identifier in the Trigger message, and the Trigger to generate a Digest, and compares the generated Digest with the Digest carried in the message. If the Digest is the same, the authentication succeeds; otherwise, the authentication fails.

Step 302: The client determines that the information is valid, authenticates the information successfully, and then sends a session request to the server.

After receiving the Trigger message, the client judges whether the Trigger message nonce carried in the Trigger message is valid. The judging method is described above. If determining that the Trigger message nonce is valid, the client searches the client management tree for the password corresponding to the server. The client uses the found password, the server-identifier in the Trigger message, and the Trigger to generate a Digest, and authenticates the Trigger message. The detailed authentication method is described in step 301. The authentication method of the client varies with the method of generating the Digest.

After the authentication succeeds, the client sends a session request to the server to initiate a session.

The session request carries: a SessionID, and authentication information (Authenticate) that includes the Digest generated by using the c_nonce.

In this step, a session connection is set up between the client and the server.

Step 303: The server returns a response that carries the authentication result and the authentication request.

According to the authentication information sent by the client, the server authenticates the client, and then returns a response that carries the authentication result and the authentication request to the client.

More specifically, the response carries: a result of the server authenticating the client, a SessionID, and authentication information (Authenticate) that includes the Digest generated by using the s_nonce.

Step 304: The client returns a message that carries the authentication result to the server.

According to the authentication information sent by the server, the client authenticates the server, and then returns a message that carries the authentication result to the server.

More specifically, this message carries: a result of the client authenticating the server, and other relevant information.

Further, in the case that the Trigger message nonce values are numbered in ascending order, with increase of the Trigger messages, the nonce value is greater and greater; in the case that the Trigger message nonce values are numbered in descending order, with increase of the Trigger messages, the nonce value decreases until 0. In such cases, the nonce needs to be adjusted, for example, the start point of count needs to be adjusted. The embodiments of the present invention provide several methods of adjusting the nonce value when necessary:

Method 1: The server updates its account password at the client at intervals. The server and the client may reset the nonce value automatically when the server updates its account password at the client.

Method 2: When the nonce needs to be adjusted (for example, when the preset time arrives or the count reaches the preset value), the server issues a command to reset the nonce. The command may be an Alert command, for example:

```
<Alert>
<CmdID>1</CmdID>
<Data>1227</Data> <!-replace nonce count -->
</Alert>
```

After adjusting the nonce, the server issues a command to change its account password at the client, thus preventing message interception and attacks by malicious servers.

Method 3: Because the server can operate the client management tree of the client directly, the server may add a node in its account information on the client management tree, and use the node to store the nonce values received and retained by the client. The node may be:

<X>/AppAuth/<X>/SNAAuthCount

Afterward, when the nonce needs to be adjusted (for example, when the preset time arrives or the count reaches the preset value), the server issues a Replace command to the node. A command instance is as follows:

```
<Replace>
<CmdID>4</CmdID>
<Item>
<Target>
<LocURI>./DMAcc/serverA/AppAuth/1/SNAAuthCount</LocURI>
</Target>
<Data>1</Data>
</Item>
</Replace>
```

After adjusting the nonce, the server issues a command to change its account password at the client, thus preventing message interception and attacks by malicious servers.

Method 4: When the nonce needs to be adjusted (for example, when the preset time arrives or the count reaches the preset value), the client sends a Replace request to the server. After the client receives an acknowledgement from the server, both parties adjust the nonce. Upon completion of the adjustment, the server updates its account password at the client, thus preventing message interception and attacks by malicious servers.

In the authentication method provided in Embodiment 1 of the present invention, a nonce different from the s_nonce and the c_nonce and available to the Trigger message is provided. Once a new session is initiated, the server generates a nonce to be exclusively used by the Trigger message to trigger a session. The client uses the nonce to authenticate the Trigger message. Even if the s_nonce stored by the server is incorrect, the client can still initiate a session. In this case, if the s_nonce or the c_nonce is incorrect, the s_nonce or the c_nonce can be updated through interaction to implement the authentication.

Figure 5:
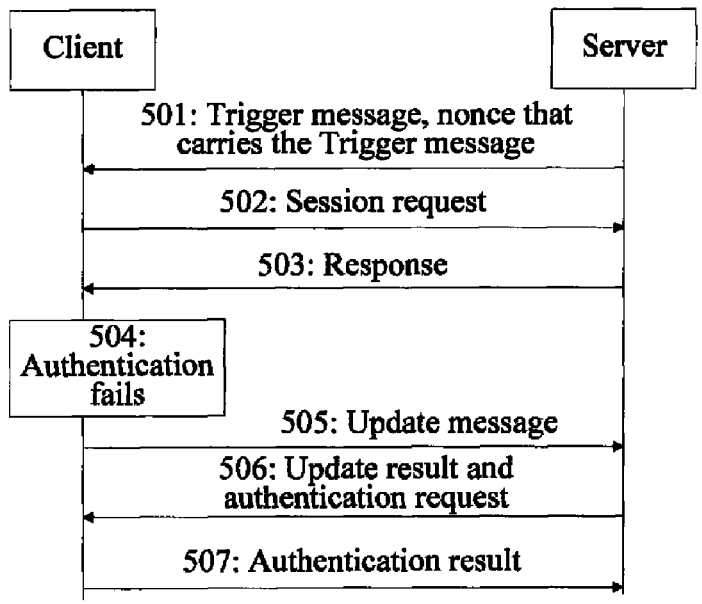
FIG. 5 is a flowchart of an authentication method when the s_nonce is incorrect in Embodiment 1 of the present invention.

Taking an incorrect s_nonce as an example, as shown in FIG. 5, the authentication method provided in Embodiment 1 of the present invention includes the following steps:

Step 501: The server sends a Trigger message to the client. The message carries a Trigger message nonce.

Before the sending, the server generates a Trigger message nonce, and uses this nonce to generate a Digest, and then uses the Digest to generate a Trigger message.

Step 502: The client determines that the Trigger message nonce carried in the Trigger message is valid, authenticates the message successfully, and then sends a session request to the server.

After receiving the Trigger message, the client judges whether the Trigger message nonce carried in the Trigger message is valid. The judging method is described above. If determining that the Trigger message nonce is valid, the client searches the client management tree for the password corresponding to the server. The client uses the found password, the server-identifier in the Trigger message, and the Trigger to generate a Digest, and authenticates the Trigger message. The detailed authentication method is described in step 301. The authentication method of the client varies with the method of generating the Digest.

After the authentication succeeds, the client sends a session request to the server to initiate a session.

The session request carries: a SessionID, and authentication information (Authenticate) that includes the Digest generated by using the c_nonce.

In this step, a session connection is set up between the client and the server.

Step 503: The server returns a response that carries the authentication result and the authentication request.

According to the authentication information sent by the client, the server authenticates the client, and then returns a response that carries the authentication result and the authentication request to the client.

More specifically, the response carries: a result of the server authenticating the client, a SessionID, and authentication information (Authenticate) that includes the Digest generated by using the s_nonce.

Step 504: The client uses the stored s_nonce to authenticate the server, but the authentication fails.

Step 505: The client sends a Challenge message and an s_nonce update message to the server.

Step 506: The server uses a new s_nonce to generate authentication information, and sends an authentication request to the client again.

After receiving the update message, the server updates the stored s_nonce as indicated by the client, uses the updated s_nonce to generate a new authentication request, and sends the update result and the new authentication request to the server.

Step 507: The client returns a message that carries the authentication result to the server.

According to the authentication request that is sent by the server and generated by using the updated s_nonce, the client authenticates the server, and then returns a message that carries the authentication result to the server.

More specifically, this message carries: a result of the client authenticating the server, and other relevant information.

In the authentication method provided in Embodiment 1 of the present invention, once a new session is initiated, the server generates a nonce exclusively available to the Trigger message for triggering a session. In the authentication method provided in Embodiment 2 of the present invention, the nonce exclusively available to the Trigger message for triggering a session is generated only when the server regards the s_nonce as incorrect.

Figure 6:
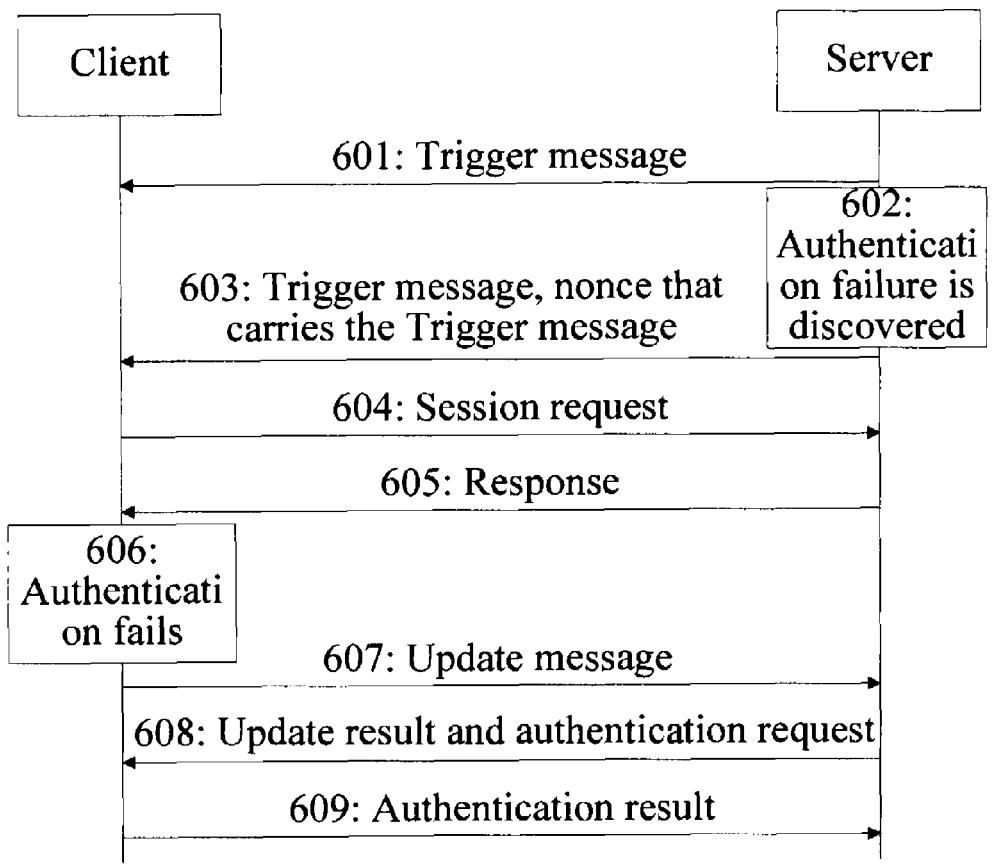
FIG. 6 is a flowchart of an authentication method in Embodiment 2 of the present invention.

As shown in FIG. 6, the authentication method provided in Embodiment 2 of the present invention includes the following steps:

Step 601: The server sends a Trigger message to the client. The message carries an s_nonce.

Step 602: The server discovers that the authentication fails.

If the server receives no message returned from the client within a specific period, the server regards the authentication as failed.

Step 603: The server sends a new Trigger message to the client. The message carries a Trigger message nonce.

Before the sending, the server generates a Trigger message nonce, and uses this nonce to generate a Digest, and then uses the Digest to generate a Trigger message.

Step 604: The client determines that the Trigger message nonce carried in the Trigger message is valid, authenticates the message successfully, and then sends a session request to the server.

After receiving the Trigger message, the client decides whether to use the s_nonce or the Trigger message nonce to authenticate by judging whether the Trigger message uses the Trigger message nonce.

The judgment method is: The client judges whether the Trigger message uses the Trigger message nonce by judging whether the Trigger message includes a nonce field. That is, if the Trigger message includes a nonce field, the Trigger message uses the Trigger message nonce. Alternatively, the client judges whether the Trigger message uses the Trigger message nonce by judging the version field information in the Trigger message. That is because the message version reveals whether the message uses the Trigger message nonce.

After receiving the Trigger message, the client judges whether the Trigger message nonce carried in the Trigger message is valid. The judging method is described above. If determining that the Trigger message nonce is valid, the client searches the client management tree for the password corresponding to the server. The client uses the found password, the server-identifier in the Trigger message, and the Trigger to generate a Digest, and authenticates the Trigger message. The detailed authentication method is described in step 301. The authentication method of the client varies with the method of generating the Digest.

After the authentication succeeds, the client sends a session request to the server to initiate a session.

The session request carries: a SessionID, and authentication information (Authenticate) that includes the Digest generated by using the c_nonce.

In this step, a session connection is set up between the client and the server.

Step 605: The server returns a response that carries the authentication result and the authentication request.

This step is similar to step 503, and is not detailed here any further.

Step 606: The client uses the stored s_nonce to authenticate the server, but the authentication fails.

Step 607: The client sends a message that carries a Challenge and a new s_nonce to the server.

Step 608: The server returns an update result and a new authentication request to the client.

This step is similar to step 506, and is not detailed here any further.

Step 609: The client returns a message that carries the authentication result to the server.

This step is similar to step 507, and is not detailed here any further.

In the authentication method provided in Embodiment 2 of the present invention, when the server regards the s_nonce as incorrect, the server generates nonce exclusively available to the Trigger message for triggering a session. The client processes the Trigger message according to the authentication method provided in Embodiment 1 of the present invention. In the authentication method provided in Embodiment 3 of the present invention, the client may decide whether to update the s_nonce by judging whether the Trigger message uses the nonce exclusively available to the Trigger message. If the Trigger message uses the nonce exclusively available to the Trigger message, the client updates the s_nonce directly so that the server can use the updated s_nonce directly for authenticating in the session.

In the authentication methods provided in the first and second embodiments of the present invention, when the authentication fails, no default nonce is required to implement the authentication, thus improving the system security.

In the authentication method provided in Embodiment 3 of the present invention, the s_nonce and the c_nonce are updated on the basis of the prior art, and the server password and the client password are updated accordingly. The updated server password leads to a different server Digest generated by using the default nonce, and prevents the message replay attacks to the client. The updated client password leads to a different client Digest generated by using the default nonce, prevents the message replay attacks to the server, and improves the system security.

Figure 7:
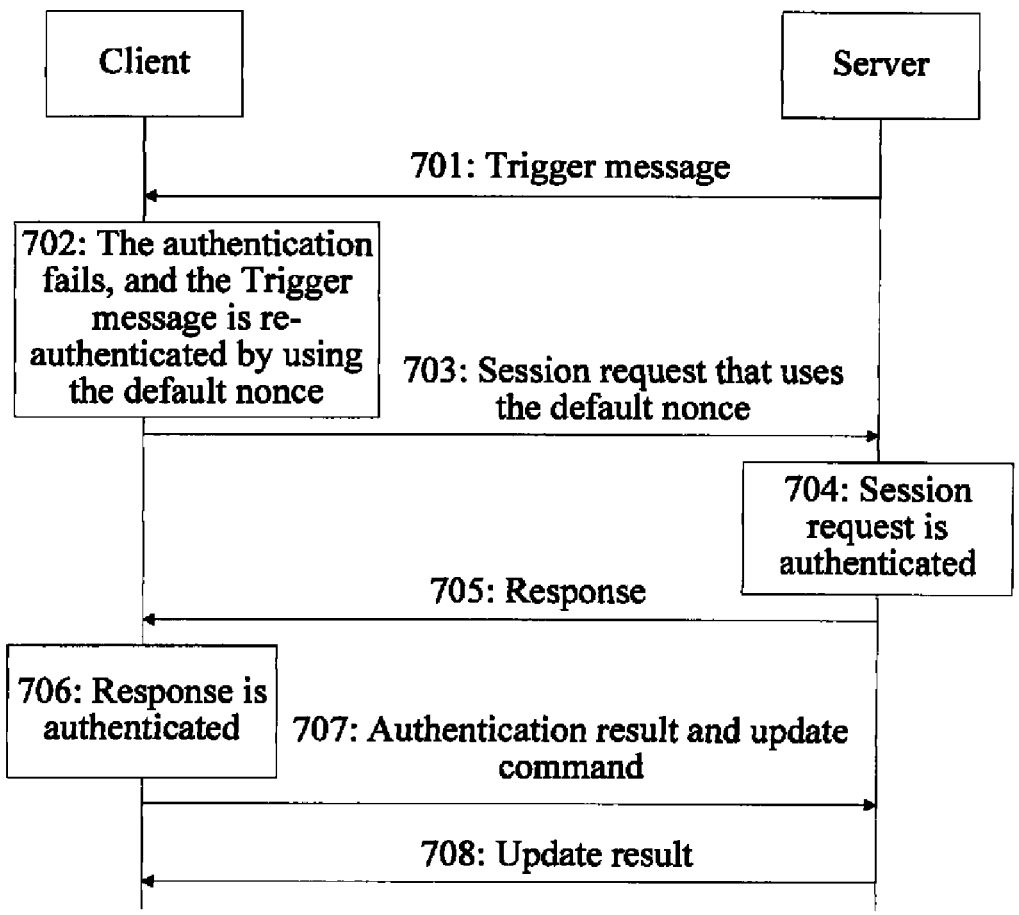
FIG. 7 is a flowchart of an authentication method in Embodiment 4 of the present invention.

In the authentication method provided in Embodiment 4 of the present invention, the correlation between steps is strengthened, and the previous step is used as an authentication basis of the next step, with a view to improving the system security. As shown in FIG. 7, the authentication method includes the following steps:

Step 701: The client receives a Trigger message for triggering a session, and authenticates the message.

Step 702: The client authenticates the Trigger message unsuccessfully, and uses the default nonce to re-authenticate.

Step 703: The client sends a session request to a server, where the session request is generated by using a default nonce.

If the authentication performed by using the default nonce succeeds, the client sends a session request to the server indicated by the Trigger message. If the session uses the application layer security mechanism, the message carries the authentication information generated by using the default nonce, and the process proceeds to step 704. If the authentication performed by using the default nonce fails, the client ignores the Trigger message without initiating any session, and the process is ended.

Step 704: The server authenticates the session request sent by the client.

The server authenticates the session request in two methods:

Method 1: The server uses a c_nonce to generate authentication information for authenticating, and, if the authentication succeeds, performs the normal process according to the prior art. If the authentication fails, the server uses the default nonce to generate authentication information and performs authentication again. If the authentication succeeds, the server uses the default nonce to generate a server authentication request, and the process proceeds to step 705.

Method 2: If the server determines that the session uses the application layer security mechanism, the server has sent the Trigger message generated by using the default nonce to the client, and the Trigger message is a Trigger message for triggering the session request, the server uses the default nonce to authenticate the session request. After the authentication succeeds, the process proceeds to step 705.

The method of judging whether a session request is triggered by a Trigger message is: Each session request has a unique session ID. The session ID carried in the session request is compared with the session ID carried in the Trigger message. If the session ID is the same, it indicates that the session is triggered by the Trigger message.

The step of judging whether the server has sent the Trigger message generated by using the default nonce to the client and whether the Trigger message is a Trigger message for triggering the session request may occur after the session request is authenticated successfully by using the default nonce. After the judgment succeeds, the process proceeds to step 705.

The purpose of this step is: If the server has not sent the Trigger message that is generated by using the default nonce and designed to trigger the session to the client, but receives the session request that is sent by the client and generated by using the default nonce, it indicates that the message is not normal or secure, and is probably a fraudulent message sent by a malicious third party, and can be discarded. Therefore, this step improves the system security.

Step 705: The server returns a response message to the client.

The server returns a response that carries the authentication result, the authentication request, and the command for updating c_nonce to the client.

Step 706: The client authenticates the response sent by server.

If the session uses the application layer security mechanism, the client uses a default nonce to authenticate the server. The authentication method is: The client uses an s_nonce to generate authentication information for authenticating, and, if the authentication succeeds, performs the normal process according to the prior art. If the authentication fails, the client uses the default nonce to generate authentication information and performs authentication again. If the authentication succeeds, the client updates the c_nonce, and the process proceeds to step 707.

An alternative of this step is: If the session uses the application layer security mechanism, and the client has sent the session request generated by using the default nonce to the server, the client uses the default nonce to authenticate the response sent by the server. After the authentication succeeds, the client updates the c_nonce, and the process proceeds to step 707.

The step of judging whether the client has sent the session request generated by using the default nonce to the server may occur after the authentication is performed by using the default nonce. After the authentication succeeds, the judgment is made. After the judgment succeeds, the process proceeds to step 707.

Step 707: The client returns a response to the server.

The client returns a response that carries the authentication result, the c_nonce update result, and the command for updating s_nonce to the server.

Step 708: The server returns an s_nonce update result to the client.

After the foregoing step is completed, to prevent replay attacks, the server password may be updated, or both the server password and the client password are updated.

In the foregoing step, the session ID may serve as a nonce, or the Trigger message ID may serve as a nonce in place of the default nonce, thus avoiding an unchanged public nonce and accomplishing higher security.

The authentication methods provided in the third and fourth embodiments of the present invention improve the system security effectively.

Figure 1:
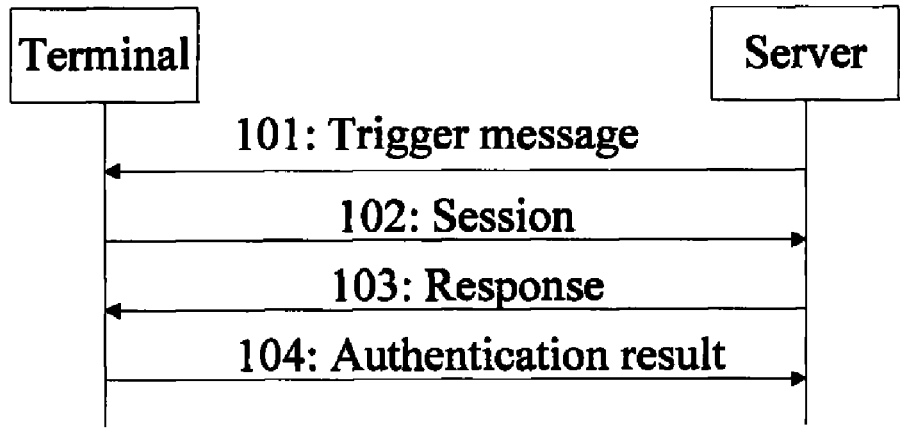
FIG. 1 is a flowchart of an authentication method in the prior art.
Figure 2:
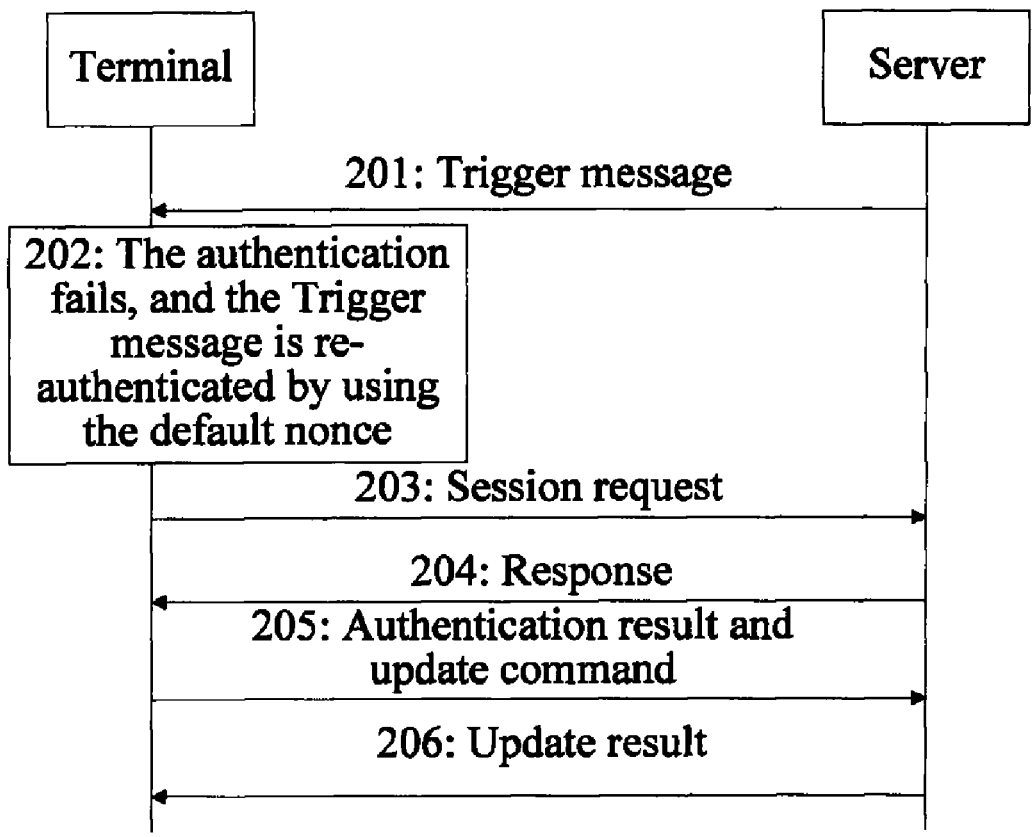
FIG. 2 is a flowchart of using a default nonce for authentication and updating s_nonce and c_nonce in the prior art.

In the prior art, when the s_nonce is incorrect and needs to be updated, the command needs to be exchanged for four times to perform the update, as shown in steps 203-204 in FIG. 2. Because the default nonce needs to be used before it is updated, the risk is high. With the message being exchanged in the mobile network for many times, the network load is higher.

A technical solution to adding a new s_nonce to the session request sent by the client is provided in the embodiments of the authentication method herein. In this way, the server can update the s_nonce directly, and use the new s_nonce to authenticate, thus reducing the frequency of signaling interaction and the frequency of using the default nonce, enhancing the system security, and relieving the network load.

Figure 8:
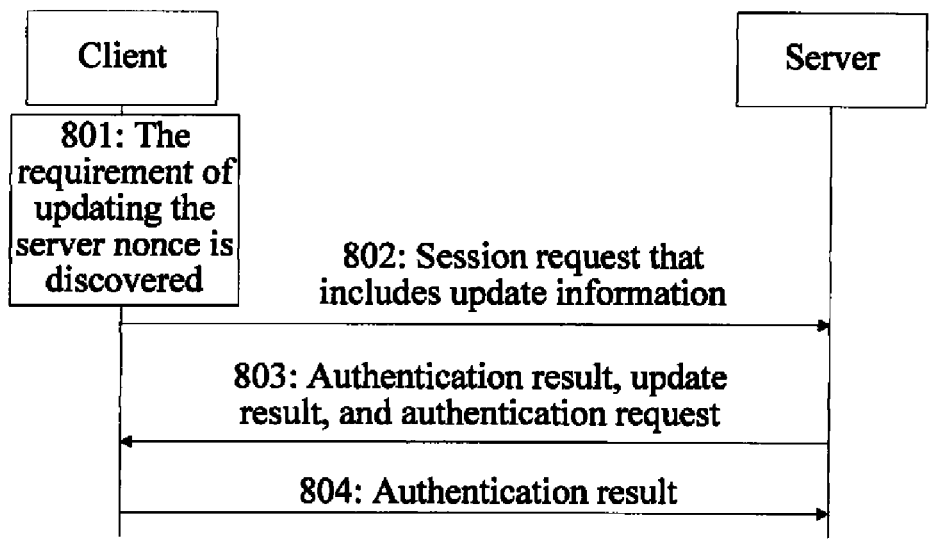
FIG. 8 is a flowchart of an authentication method in Embodiment 5 of the present invention.

As shown in FIG. 8, an authentication method provided in Embodiment 5 of the present invention includes the following steps:

Step 801: The client knows that an s_nonce needs to be updated.

The client determines that the s_nonce has expired, or finds that the s_nonce stored in the server is different from that stored in the client, and therefore, knows that the s_nonce needs to be updated.

The client discovers inconsistency between the s_nonce stored in the server and that stored in the client in the following way:

After receiving the Trigger message, the client uses the stored s_nonce to authenticate the Trigger message. If the authentication fails for certain reasons, the client uses the default nonce or uses the session ID or Trigger message ID as a nonce to generate a Digest and re-authenticate the Trigger message.

If the authentication succeeds, it indicates that the s_nonce previously used by the server is incorrect, and the s_nonce stored in the server is different from that stored in the client.

Step 802: The client sends a session request that carries update information to the server.

After knowing that the s_nonce needs to be updated, the client generates a new s_nonce, adds the s_nonce to the session request, and sends the session request to the server, requesting the server to initiate a session and update the s_nonce.

The session request carries: a SessionID, newly generated s_nonce, and authentication information (Authenticate) that includes the Digest generated by using the c_nonce. In this session request, the default nonce or the session ID or the Trigger message ID may be used as a nonce to generate the Digest.

The newly generated s_nonce may be carried in a SyncHdr or SyncBody of the session request (SyncML).

The carrying method is described below, assuming that the newly generated s_nonce is carried in a SyncHdr.

To carry s_nonce, the SyncHdr is modified as follows:
SyncHdr (VerDTD, VerProto, SessionID, MsgID, Target, Source, RespURI?, NoResp?, Cred?, Chal?, Meta?)>

The SyncML message that carries the s_nonce is:

```
<SyncML xmlns='SYNCML:SYNCML1.2'>
<SyncHdr>
...
<Chal>
<Meta>
<NextNonce
xmlns='syncml:metinf'>LG3iZQhhdmKNHg==</NextNonce>
</Meta>
</Chal>
</SyncHdr>
<SyncBody>
...
</SyncBody>
</SyncML>
```

Step 803: The server returns a response that carries the authentication result, the update result, and the authentication request.

After receiving the session request, the server uses the c_nonce to authenticate the client, and uses the updated s_nonce carried in the session request to update the stored s_nonce. After the authentication succeeds and the update is completed, the server uses the updated s_nonce to generate an authentication request, and returns a response that carries the authentication result, the update command and the authentication request to the client. Preferably, the server uses a c_nonce to authenticate the session request. After the authentication succeeds, the server updates the s_nonce, thus keeping synchronization between the s_nonce stored in the server and that stored in the client.

More specifically, the response carries: a result of the server authenticating the client, an s_nonce update result, and authentication information (Authenticate) that includes the Digest generated by using the updated s_nonce.

Step 804: The client returns a message that carries the authentication result to the server.

The client uses the updated s_nonce to authenticate the server. After the authentication succeeds, the client returns an authentication result to the server.

Further, the authentication method provided in Embodiment 5 of the present invention may be applied to the authentication method provided in Embodiment 2 of the present invention to reduce the frequency of signaling interaction.

Figure 9:
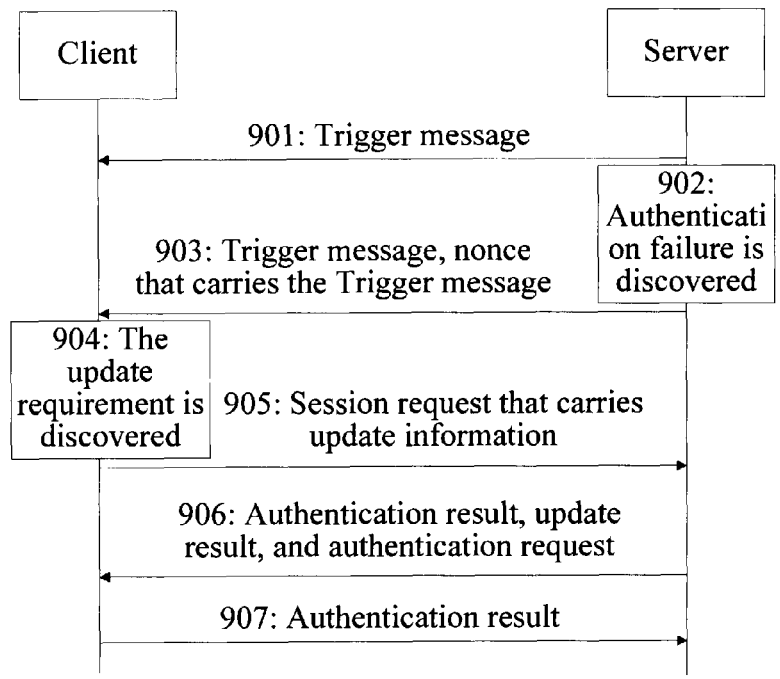
FIG. 9 is a flowchart of an authentication method in Embodiment 6 of the present invention.

As shown in FIG. 9, the authentication method provided in Embodiment 6 of the present invention includes the following steps:

Step 901: The server sends a Trigger message to the client. The message carries an s_nonce.

Step 902: The server discovers that the authentication fails.

For example, if the server receives no session request from the client within a specific period, the server regards the authentication as failed.

Step 903: The server sends a Trigger message to the client. The message carries a Trigger message nonce.

Before the sending, the server generates a Trigger message nonce, and uses this nonce to generate a Digest, and then uses the Digest to generate a Trigger message.

Step 904: The client discovers that an s_nonce needs to be updated.

After receiving the Trigger message, the client judges whether the Trigger message uses the nonce exclusively available to the Trigger message, and decides whether the s_nonce needs to be updated. As a result, the client discovers that the Trigger message uses the nonce exclusively available to the Trigger message, and the s_nonce needs to be updated.

The method of judging whether the Trigger message uses the nonce exclusively available to the Trigger message is: The client judges whether the Trigger message uses the Trigger message nonce by judging whether the Trigger message includes a nonce field. That is, if the Trigger message includes a nonce field, the Trigger message uses the Trigger message nonce. Alternatively, the client judges whether the Trigger message uses the Trigger message nonce by judging the version field information in the Trigger message. That is because the version field reveals whether the message uses the Trigger message nonce.

If the client discovers that the Trigger message uses other than the Trigger message nonce, it indicates that the s_nonce does not need to be updated, and the ordinary process is performed.

Step 905: The client sends a session request that carries update information to the server.

After receiving the Trigger message and determining that the Trigger message uses the Trigger message nonce exclusively available to the Trigger message, the client judges whether the Trigger message nonce carried in the Trigger message is valid. The judging method is described above. If determining that the Trigger message nonce is valid, the client searches the client management tree for the password corresponding to the server. The client uses the found password, the server-identifier, and the Trigger to generate a Digest, and authenticates the Trigger message. The detailed authentication method is described in step 301. The authentication method of the client varies with the method of generating the Digest.

After authenticating the Trigger message successfully, the client generates a new s_nonce, adds the s_nonce to a session request, and sends the session request that carries update information to the server, requesting the server to initiate a session and update the s_nonce.

The session request carries: a SessionID, updated s_nonce, and authentication information (Authenticate) that includes the Digest generated by using the c_nonce.

The newly generated s_nonce may be carried in the SyncHdr or SyncBody of the session request.

Step 906: The server returns a response that carries the authentication result, the update result, and the authentication request.

After receiving the session request, the server uses the c_nonce to authenticate the client, and uses the updated s_nonce carried in the session request to update the stored s_nonce. After the authentication succeeds and the update is completed, the server uses the updated s_nonce to generate an authentication request, and returns a response that carries the authentication result, the update result and the authentication request to the client.

More specifically, the response carries: a result of the server authenticating the client, an s_nonce update result, and authentication information (Authenticate) that includes the Digest generated by using the updated s_nonce.

Step 907: The client returns a message that carries the authentication result to the server.

The client uses the updated s_nonce to authenticate the server. After the authentication succeeds, the client returns an authentication result to the server.

More specifically, this message carries: a result of authenticating the server, and other relevant information.

In the prior art, sometimes the client decides not to initiate the session after authenticating the server successfully. In this case, if the client discovers that the s_nonce expires or is incorrect and needs to be updated, it is impossible to update the s_nonce or maintain the s_nonce effectively.

Therefore, the authentication method in Embodiment 7 of the present invention provides the corresponding solution.

In the authentication method provided in Embodiment 7 of the present invention, after the client authenticates the server successfully and decides not to initiate a session, the client sends a state response to the server. If the client determines that the s_nonce expires or is inconsistent with the s_nonce stored in the server, the client generates a new s_nonce, and adds the new s_nonce into the state response. The client uses the c_nonce, the client username and password, and the response message body to calculate the Digest. Therefore, after receiving the state response, the server can authenticate the information according to the Digest calculated by using the c_nonce, the client username and password, and the response message body. After the authentication succeeds, the server updates the stored s_nonce according to the new s_nonce carried in the state response.

Figure 10:
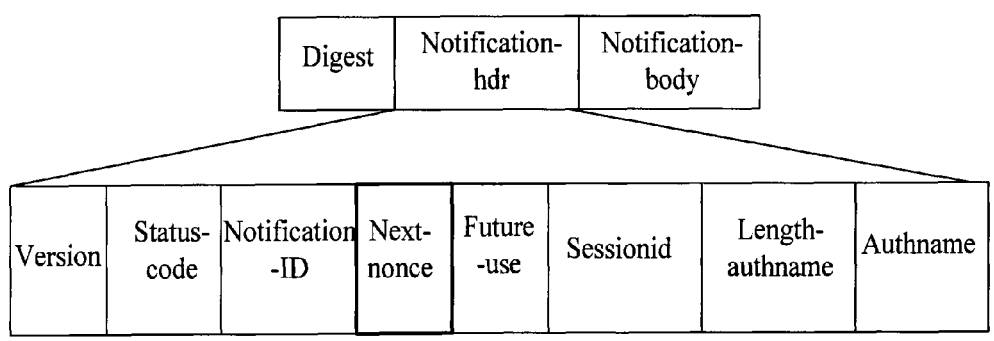
FIG. 10 shows a state response message format that carries a new s_nonce in an authentication method in Embodiment 7 of the present invention.

As shown in FIG. 10, the state response with the new s_nonce includes: a Digest, a notification header (notification-hdr), and a notification body (notification-body).

The notification-hdr includes: version, status-code, Notification-ID, new nonce (Next-nonce), reserved (future-use), session ID (SessionID length of authentication ID (length-authname), and authentication ID (authname).

The NextNonce is the new s_nonce.

In the prior art, after the s_nonce is incorrect, the s_nonce and the c_nonce are never put into use again, and the client and the server use the default nonce to generate authentication information. Consequently, the malicious server may attack the server or client by intercepting any message.

The s_nonce is different from the c_nonce, and they are generated by the server and the client respectively and are available to the opposite party. Therefore, when either of them is erroneous, the other is not affected. In the authentication methods provided in the eighth and ninth embodiments of the present invention, a solution is provided to update the s_nonce separately when the s_nonce is erroneous.

The s_nonce is erroneous if: the client determines that the s_nonce has expired, or discovers that the s_nonce stored in the server is erroneous, for example, the client determines that the s_nonce stored in the server is inconsistent or asynchronous with the s_nonce stored in the client.

The method of judging consistency and synchronization between the s_nonce stored in the server and the s_nonce stored in the client may be: The server receives no response from the client within a specific period after using the s_nonce to send a Trigger message; or the client discovers that the Trigger message sent by the server carries a Digest generated by using the default nonce; or the client discovers that no nonce is used in the Trigger message sent by the server.

After discovering the error of the s_nonce and authenticating the server successfully, the client initiates a session request. In the session request, the authentication information for authenticating the client is generated by using the c_nonce, or the basic authentication mode (namely, username plus password) is applied, and the s_nonce is further updated.

Two methods of updating the s_nonce are provided in Embodiment 7 and Embodiment 8 of the authentication method respectively.

Figure 11:
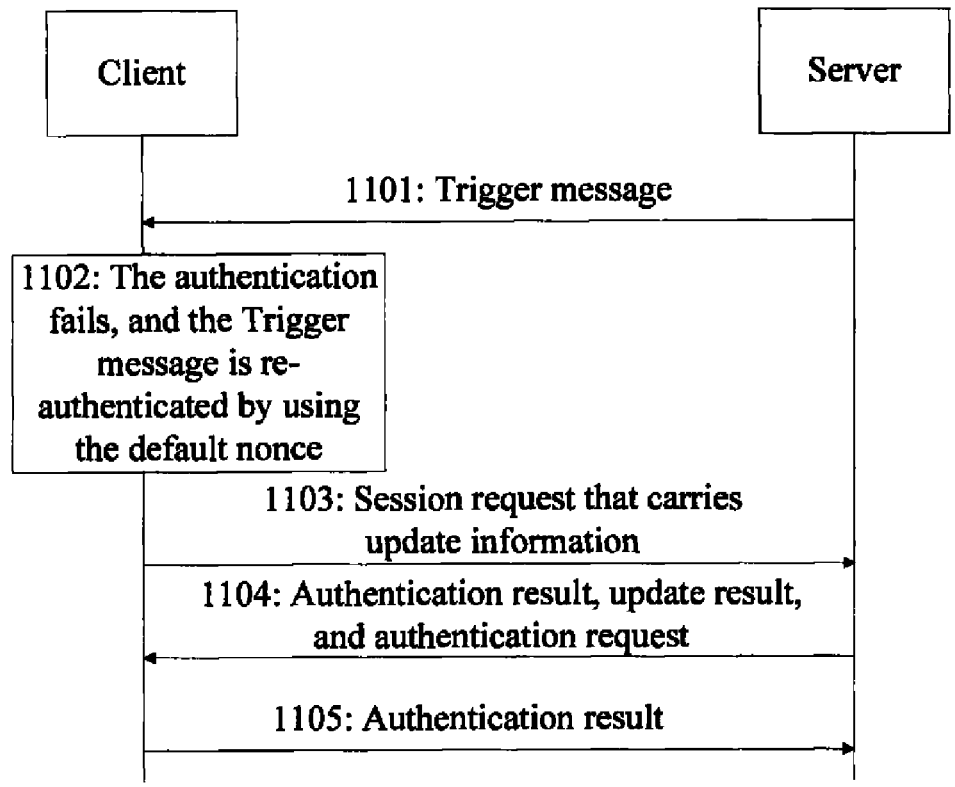
FIG. 11 is a flowchart of an authentication method in Embodiment 8 of the present invention.

In Embodiment 8, the server uses a default nonce to generate a Trigger message. As shown in FIG. 11, the authentication method includes the following steps:

Step 1101: The server sends a Trigger message to the client to trigger a session.

After determining that the previous s_nonce is incorrect, the server uses the default nonce to generate a Trigger message and sends the message to the client. The Trigger message carries: Digest generated by using the default nonce, Trigger-Info, and other relevant information.

Step 1102: The client authenticates the Trigger message unsuccessfully, and uses the default nonce to re-authenticate.

After receiving the Trigger message, the client uses the stored s_nonce to generate a Digest and authenticate the Trigger message. If the authentication fails for certain reasons, the client uses the default nonce to generate a Digest and re-authenticate the Trigger message.

If the authentication succeeds, it indicates that the s_nonce previously used by the server is incorrect, and the s_nonce stored in the server is different from that stored in the client.

Step 1103: The client sends a session request that carries update information to the server.

After authenticating the Trigger message successfully by using the default nonce, the client generates a new s_nonce, adds the s_nonce to a session request, and sends the session request that carries update information to the server, requesting the server to initiate a session and update the s_nonce.

The session request carries: a SessionID, updated s_nonce, and authentication information (Authenticate) that includes the Digest generated by using the c_nonce.

In the foregoing step, the session ID may serve as a nonce, or the Trigger message ID may serve as a nonce in place of the default nonce, thus avoiding an unchanged public nonce and accomplishing higher security.

The method of adding the updated s_nonce to the session request is basically the same as that in Embodiment 3 and Embodiment 4, and is not repeated here any further.

Step 1104: The server returns a response that carries the authentication result, the update result, and the authentication request.

After receiving the session request, the server uses the c_nonce to authenticate the client, and uses the updated s_nonce carried in the session request to update the stored s_nonce. After the authentication succeeds and the update is completed, the server uses the updated s_nonce to generate an authentication request, and returns a response that carries the authentication result, the update result and the authentication request to the client.

More specifically, the response carries: a result of the server authenticating the client, an s_nonce update result, and authentication information (Authenticate) that includes the Digest generated by using the updated s_nonce.

Step 1105: The client returns a message that carries the authentication result to the server.

The client uses the updated s_nonce to authenticate the server. After the authentication succeeds, the client returns an authentication result to the server.

Figure 12:
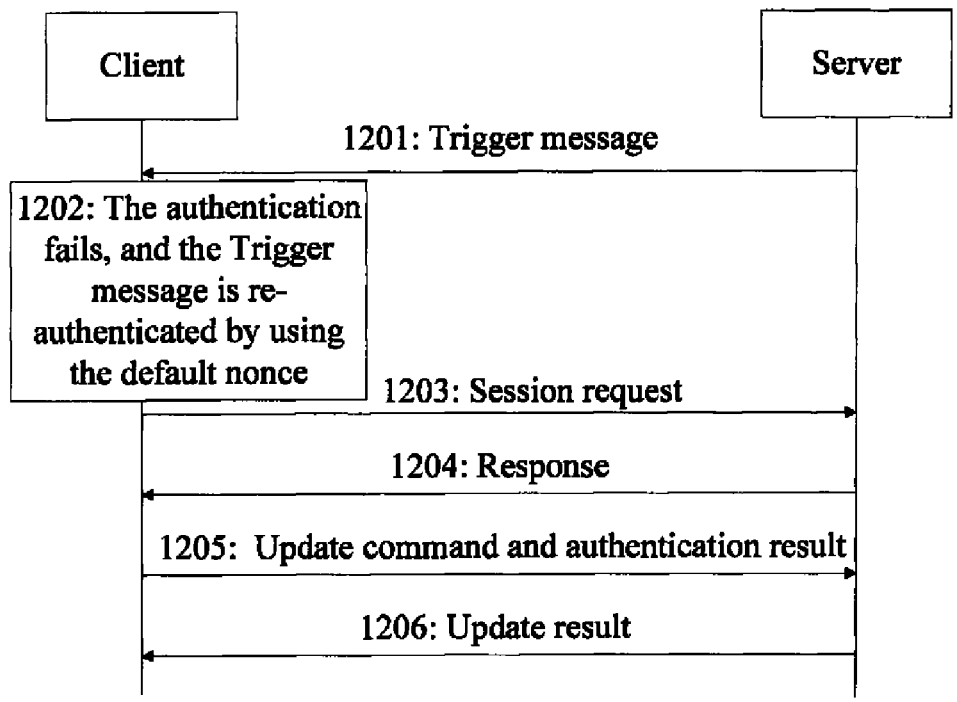
FIG. 12 is a flowchart of an authentication method in Embodiment 9 of the present invention.

In Embodiment 9, the server uses a default nonce to generate a Trigger message, but the session request carries no update information. As shown in FIG. 12, the authentication method includes the following steps:

Step 1201: The server sends a Trigger message to the client to trigger a session.

After determining that the previous s_nonce is incorrect, the server uses the default nonce to generate a Trigger message and sends the message to the client. The Trigger message carries: Digest generated by using the default nonce, TriggerInfo, and other relevant information.

Step 1202: The client authenticates the Trigger message unsuccessfully, and uses the default nonce to re-authenticate.

After receiving the Trigger message, the client uses the stored s_nonce to generate a Digest and authenticate the Trigger message. If the authentication fails for certain reasons, the client uses the default nonce to generate a Digest and re-authenticate the Trigger message.

If the authentication succeeds, it indicates that the s_nonce previously used by the server is incorrect, and the s_nonce stored in the server is different from that stored in the client.

Step 1203: The client authenticates the information successfully, and then sends a session request to the server.

After the authentication succeeds, the client sends a session request to the server to initiate a session.

The session request carries: a SessionID, and authentication information (Authenticate) that includes the Digest generated by using the c_nonce.

In this step, a session connection is set up between the client and the server.

Step 1204: The server returns a response that carries the authentication result and the authentication request.

According to the authentication information sent by the client, the server authenticates the client. After the authentication succeeds, the server uses a default nonce to generate authentication information (Authenticate), and then returns a response that carries the authentication result and the authentication request to the client.

More specifically, the response carries: a result of the server authenticating the client, a SessionID, and authentication information (Authenticate) that includes the Digest generated by using the default nonce.

Step 1205: The client returns an update command and an authentication result to the server.

The client authenticates the server by using the default nonce. After the authentication succeeds, the client generates a new s_nonce, and sends a command for updating s_nonce and a result of authenticating the server to the server.

Step 1206: The server returns an update result to the client.

After receiving the update message, the server updates the stored s_nonce as indicated by the client, and returns an update result to the client.

In the foregoing step, the session ID may serve as a nonce, or the Trigger message ID may serve as a nonce in place of the default nonce, thus avoiding an unchanged public nonce and accomplishing higher security.

In this case, the server password may be updated to improve the system reliability.

In another embodiment, the server uses a default nonce to generate a Trigger message, but the session request carries no default nonce. The authentication method includes the following steps:

After determining that the previous s_nonce is incorrect, the server uses the default nonce or uses the session ID or Trigger message ID as a nonce to generate a Trigger message, and sends the message to the client. The Trigger message carries: Digest generated by using the default nonce or the session ID or the Trigger message ID, TriggerInfo, and other relevant information.

After receiving the Trigger message, the client uses the stored s_nonce to generate a Digest and authenticate the Trigger message. If the authentication fails for certain reasons, the client uses the default nonce or uses the session ID or Trigger message ID as a nonce to generate a Digest, and re-authenticate the Trigger message. If the authentication succeeds, the client sends a session request to the server to initiate a session. The session request carries: SessionID, and authentication information (Authenticate) that includes the Digest generated by using the c_nonce.

The server uses the c_nonce to authenticate the session request. If the authentication fails, the server sends a Challenge message to update the c_nonce and require reauthentication. After the authentication succeeds, the server sends an authentication request generated by using the s_nonce, and the client uses the s_nonce to authenticate. If the authentication fails, the client sends a Challenge message to update the s_nonce and require reauthentication. After the authentication succeeds, the client returns a result.

Further, in the foregoing step, the client may add the updated s_nonce to the session request and send the request to the server. The authentication request sent by the server uses the new s_nonce.

As described above, when the s_nonce is erroneous, only the s_nonce is updated, and the c_nonce is not updated. When the system handles the s_nonce error, even if the system uses a default nonce or uses the session ID or Trigger message ID as a nonce to authenticate, because the c_nonce does not need to be updated, the client may use the c_nonce to generate a session request, thus reducing the frequency of using the default nonce or using the session ID or Trigger message ID as a nonce, and improving the system security.

In the prior art, the s_nonce and the c_nonce used in a session are generated and updated by the client and the server respectively, thus imposing a heavier management load onto the client and the server.

In Embodiment 10 of the present invention, one nonce is used in a session to replace the s_nonce and the c_nonce in the prior art and implement the authentication between the client and the server. The same session is secured by a transmission layer security mechanism or an application layer security mechanism, and therefore, the same nonce may be used to implement authentication between the client and the server.

The nonce may be generated by the server or the client. Assuming that the nonce is generated by the server, the authentication method in Embodiment 10 of the present invention is elaborated below.

In Embodiment 10, two methods of updating the nonce are provided, as described below:

Method 1: The server updates the nonce.

First, the server issues a nonce update command (NextNonce). The NextNonce command carries a new nonce.

After receiving the NextNonce command, the client uses the new nonce carried in the NextNonce command to update the stored nonce.

The update command may be carried in an authentication message, namely, the message carries the update command and the server authentication information. The update command may also be carried in another management message, namely, the message does not carry the server authentication information. If the update command is carried in the authentication message, after the client receives the message, the client updates the nonce according to the NextNonce command, and then uses the updated nonce to generate a Digest and authenticate the information. The authentication succeeds. In this case, if a malicious server intercepts the message, the malicious server can launch replay attacks onto the client anytime. To prevent such attacks, when the NextNonce command is carried in the authentication message, the client uses the Digest generated by using the non-updated nonce to authenticate the information. After receiving message, the client uses the Digest generated by using the non-updated nonce to authenticate first. After the authentication succeeds, the client updates the stored nonce according to the NextNonce command. If another management message carries the nonce update command, because a message that carries the new nonce and another message that carries the authentication information are sent to the opposite party separately, no risk of replay attacks exists.

Figure 13:
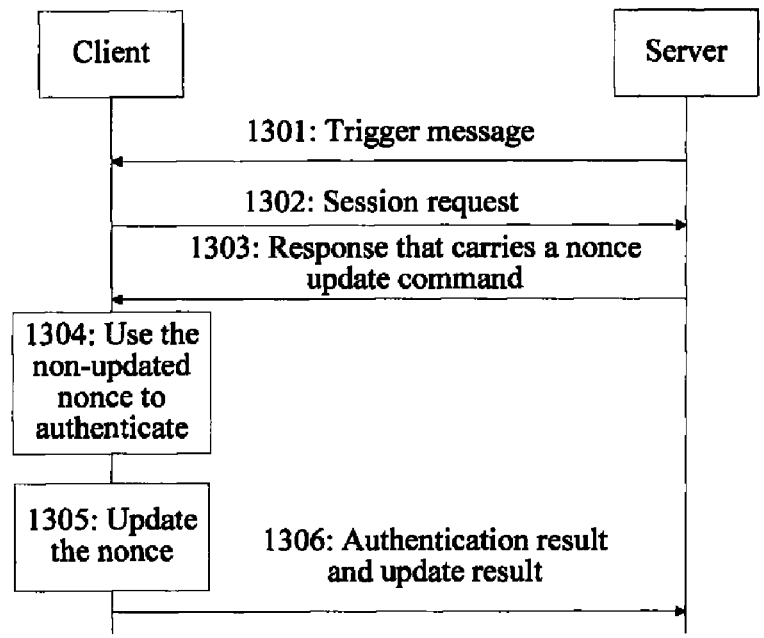
FIG. 13 is a flowchart of an authentication method in Embodiment 10 of the present invention.

As shown in FIG. 13, assuming that the response is carried in the NextNonce command, the process is as follows:

Step 1301: The server sends a Trigger message to the client to trigger a session.

The Trigger message carries: a Digest generated by using the shared nonce, and TriggerInfo.

The shared nonce is generated by the server and available to the server and the client.

In practice, the shared nonce in this step may be a Trigger message nonce, or default nonce. Sometimes the server may use no nonce, but use the server ID and password to generate the Trigger message for triggering a session, and the client uses the server ID and password to generate a Digest to authenticate the Trigger message.

Step 1302: The client sends a session request to the server.

After receiving the Trigger message, the client uses the stored s_nonce to generate a Digest and authenticate the Trigger message. If the authentication succeeds, the client sends a session request to the server to initiate a session.

The session request carries: a SessionID, and authentication information (Authenticate) that includes the Digest generated by using the shared nonce.

In this step, a session connection is set up between the client and the server.

Step 1303: The server returns a response that carries the authentication result and the authentication request, and the response carries the NextNonce command.

According to the authentication information sent by the client, the server authenticates the client. After the authentication succeeds, if the server discovers that the shared nonce needs to be updated, the server generates a new shared nonce, and then returns a response that carries the authentication result and the authentication request to the client. The response carries the NextNonce command.

More specifically, the response carries: a result of the server authenticating the client, a SessionID, authentication information (Authenticate) that includes the Digest generated by using the non-updated nonce, and a NextNonce command that includes the new nonce.

Step 1304: After receiving the response, the client uses the non-updated nonce to authenticate the message.

Step 1305: The authentication succeeds, and the client uses the new nonce carried in the NextNonce command to update the stored shared nonce as indicated by the NextNonce command.

Step 1306: The client returns a message that carries the authentication result and the update result to the server.

More specifically, this message carries: a result of the client authenticating the server, a result of updating the shared nonce, and other relevant information.

The server and the client may define the validity period of the shared nonce differently. When the server determines that the shared nonce is valid, the validity period of the shared nonce may have ended to the client. Therefore, to keep the validity of the shared nonce to the client, Embodiment 10 of the present invention provides a technical solution in which the client requests the server to update the shared nonce.

The client may use the Alert command among the DM commands to request the server to update the shared nonce. To make the server understand the command, an Alert type is added into the command. The Alert type is an indication of requesting the server to update the nonce.

When the client believes that the nonce needs to be updated, the client sends a request of updating the shared nonce to the server through the Alert command. The request may be carried in the authentication message or another management message. After receiving the request, the server decides whether to update the nonce according to the specific conditions.

The Alert type may be defined as: org.openmobilealliance.NextNonce.

Given below is an instance of a message of the Alert type:

```
<Alert>
<CmdID>2</CmdID>
<Data>1226</Data> <!-- Generic Alert -->
<Item>
<Meta>
<Type xmlns="syncml:metinf">
org.openmobilealliance.NextNonce
</Type>
</Meta>
<Data/>
</Item>
</Alert>
```

The method of the client updating the nonce is similar to the method of the server updating the nonce, and is not repeated here any further.

Method 2: The server and the client update the nonce jointly.

Both the server and the client can generate a new nonce for updating when determining that shared nonce needs to be updated.

The nonce may be updated through a NextNonce command. Given below is an update instance:

```
<Chal>
<Meta>
<NextNonce
xmlns='syncml:metinf'>LG3iZQhhdmKNHg==</NextNonce>
</Meta>
</Chal>
```

The NextNonce command may be carried in a message in the session process. For example, the client may add the NextNonce command to a session request, and send the session request to the server, requesting the server to update the shared nonce; or add the NextNonce command into another message.

No matter whether the server or the client updates the shared nonce, if the update command is carried in the authentication message, after the opposite party receives the message, the opposite party updates the nonce first, and then uses the updated nonce to generate a Digest and authenticate the information. The authentication succeeds. In this case, if a malicious server intercepts the message, the malicious server can launch replay attacks onto the client anytime. To prevent such attacks, when the NextNonce command is carried in the authentication message, the opposite party may use the Digest generated by using the non-updated nonce to authenticate the information. After the authentication succeeds, the opposite party updates the stored nonce according to the NextNonce command. If another management message carries the nonce update command, because a message that carries the new nonce and another message that carries the authentication information are sent to the opposite party separately, no risk of attacks exists.

In Embodiment 10 of the present invention, the server and the client use a shared nonce to authenticate. In this case, if the shared nonce is erroneous, the error can be handled through any of the methods described above. In step 803 in Embodiment 5 of the present invention, the message carries a new nonce, a Digest generated by using the new nonce. In this case, if a malicious server intercepts the message, the malicious server can launch a replay attack by sending the message to the server or the client repeatedly. The server or the client is unable to identify the message, believes that the message is valid and performs the corresponding operations. To prevent such attacks, the non-updated nonce may be used to generate a Digest. In this way, after receiving the message, the server uses the non-updated nonce to calculate the Digest and authenticate the message sender, namely, the client, and then updates the stored nonce according to the NextNonce command.

Embodiment 10 of the present invention relieves the system load effectively.

Figure 14:
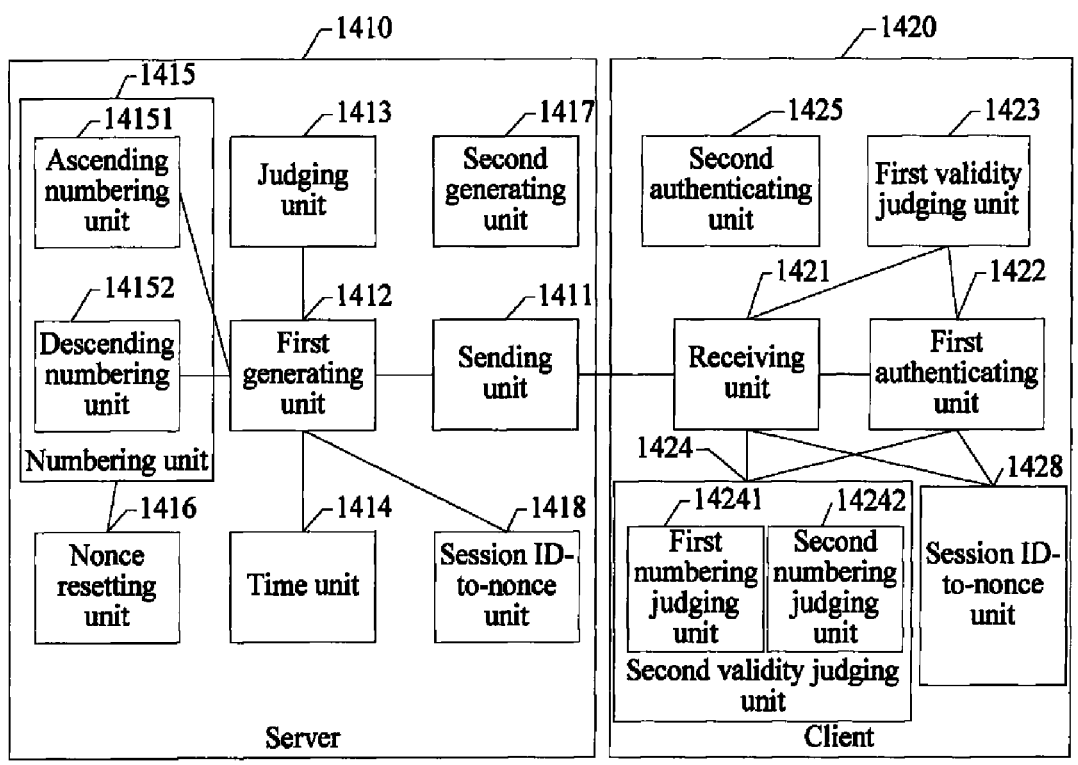
FIG. 14 shows a structure of an authentication system in Embodiment 1 of the present invention.

As shown in FIG. 14, an authentication system provided in Embodiment 1 of the present invention includes:

a server 1410, adapted to: use a Trigger message nonce to generate a Trigger message, and send the generated Trigger message; and a client 1420, adapted to: receive the Trigger message generated by using the Trigger message nonce, and use the Trigger message nonce to authenticate the generated Trigger message, namely, verify validity of the Trigger message.

The server 1410 further includes:

a first generating unit 1412, adapted to generate a Trigger message by using a Trigger message nonce;

a sending unit 1411, adapted to send the Trigger message generated by using the Trigger message nonce;

a second generating unit 1417, adapted to: generate a Trigger message by using a server nonce, and send the generated Trigger message to the client;

a judging unit 1413, adapted to control the first generating unit 1412 to use the Trigger message nonce to generate a Trigger message after determining that the Trigger message generated by using the server nonce is authenticated unsuccessfully;

a time unit 1414, adapted to: determine the system time of the server when the first generating unit 1412 uses the Trigger message nonce to generate a Trigger message, and add the system time into the Trigger message generated by using the Trigger message nonce;

a coding unit 1415, adapted to: number the Trigger messages generated by the first generating unit 1412 by using the Trigger message nonce, and use the number as the Trigger message nonce;

a nonce resetting unit 1416, adapted to reset the Trigger message nonce generated by the coding unit 1415 when necessary; and a session ID-to-nonce unit 1418, adapted to: use the session ID of the session triggered by the Trigger message as a Trigger message nonce so that the client authenticates the Trigger message by using the Trigger message nonce after receiving the Trigger message and sends a session request to request setup of a session corresponding to the session ID after the authentication succeeds.

The coding unit 1415 further includes:

an ascending numbering unit 14151, adapted to number the Trigger messages generated by using the Trigger message nonce in ascending order; and a descending numbering unit 14152, adapted to number the Trigger messages generated by using the Trigger message nonce in descending order.

The client 1420 further includes:

a receiving unit 1421, adapted to receive the Trigger message generated by using the Trigger message nonce;

a first authenticating unit 1422, adapted to: use the Trigger message nonce to authenticate the Trigger message generated by using the Trigger message nonce, namely, verify validity of the Trigger message generated by using the Trigger message nonce;

a second authenticating unit 1425, adapted to use the server nonce to authenticate the Trigger message after receiving the Trigger message, and, if the authentication fails, use the Trigger message nonce to re-authenticate the Trigger message;

a first validity judging unit 1423, adapted to: determine the local time of the client when the receiving unit 1421 receives the Trigger message generated by using the Trigger message nonce, and compare the absolute value of the difference between the local time and the system time with a preset threshold; if the absolute value is less than the preset threshold, determine that the Trigger message nonce is valid, and control the first authenticating unit 1422 to use the Trigger message nonce to authenticate the Trigger message generated by using the Trigger message nonce;

a second validity judging unit 1424, adapted to: store the Trigger message nonce carried in the Trigger message if determining that the Trigger message nonce carried in the Trigger message is valid according to the stored Trigger message nonce after the receiving unit 1421 receives the Trigger message generated by using the Trigger message nonce, and control the first authenticating unit 1422 to use the Trigger message nonce to authenticate the Trigger message generated by using the Trigger message nonce; and a session ID-to-nonce unit 1428, adapted to: use the session ID of the session triggered by the Trigger message as a Trigger message nonce, authenticate the Trigger message by using the Trigger message nonce, and send a session request to request setup of a session corresponding to the session ID after the authentication succeeds.

The second validity judging unit 1424 includes:

a first numbering judging unit 14241, adapted to: compare the Trigger message nonce stored in the client with the Trigger message nonce carried in the Trigger message; and determine that the Trigger message nonce carried in the Trigger message is valid if the Trigger message nonce carried in the Trigger message is greater than the maximum Trigger message nonce stored in the client, or if the Trigger message nonce values that have received and stored by the client do not include the Trigger message nonce carried in the Trigger message, or if the nonce values that have not received by the client include the Trigger message nonce carried in the Trigger message; and a second numbering judging unit 14242, adapted to: compare the Trigger message nonce stored in the client with the Trigger message nonce carried in the Trigger message; and determine that the Trigger message nonce carried in the Trigger message is valid if the Trigger message nonce carried in the Trigger message is less than the minimum Trigger message nonce stored in the client, or if the Trigger message nonce values that have received and stored by the client do not include the Trigger message nonce carried in the Trigger message, or if the nonce values that have not received by the client include the Trigger message nonce carried in the Trigger message.

The operation mode of the authentication system in Embodiment 1 is similar to the operation mode of the authentication method in Embodiment 1 and Embodiment 2 of the present invention, and is not repeated here any further.

Through the authentication system provided in Embodiment 1 of the present invention, when the authentication fails, no default nonce is required for implementing the authentication, thus improving the system security.

The server provided in Embodiment 1 of the present invention is basically the same as the server in the authentication system provided in Embodiment 1 of the present invention, and is not repeated here any further.

Figure 15:
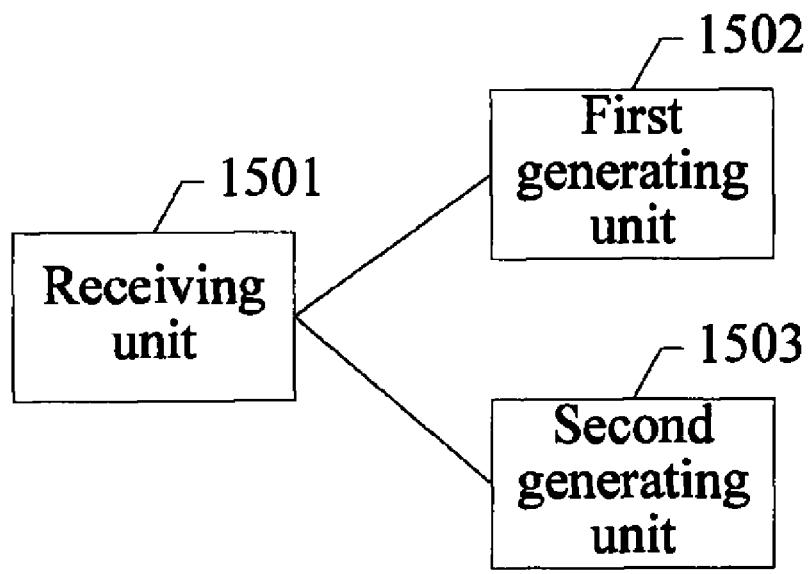
FIG. 15 shows a structure of a client in Embodiment 1 of the present invention.

As shown in FIG. 15, the client provided in Embodiment 1 of the present invention includes:

a receiving unit 1501, adapted to receive a Trigger message sent by the server;

a first generating unit 1512, adapted to: generate a new server nonce if determining that the server nonce needs to be updated after receiving the Trigger message, add the new server nonce to a session request, and send the session request to the server so that the server can use the new server nonce to update the stored server nonce after receiving the session request that carries the new server nonce; and a second generating unit 1503, adapted to: generate a new server nonce if deciding not to initiate a session and determining that the server nonce needs to be updated after receiving the Trigger message, add the new server nonce into a state response, and send the state response to the server so that the server can use the new server nonce to update the stored server nonce after receiving the state response that carries the new server nonce.

The operation mode of the client provided in Embodiment 1 is similar to the operation mode of the client in the authentication method provided in the fourth, fifth and sixth embodiments of the present invention, and is not repeated here any further.

Through the client provided in Embodiment 1 of the present invention, when the s_nonce needs to be updated, the session request carries an update command directly, thus reducing the frequency of signaling interaction, relieving the system load, reducing the frequency of using the default nonce to perform authentication, and enhancing the system security.

Figure 16:
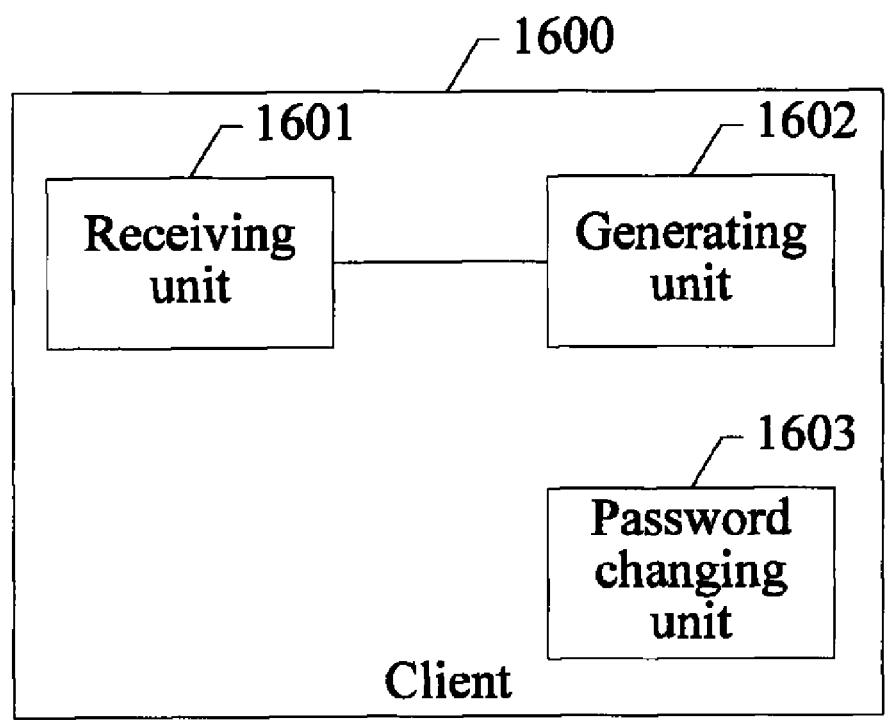
FIG. 16 shows a structure of a client in Embodiment 2 of the present invention.

As shown in FIG. 16, the client 1600 provided in Embodiment 2 of the present invention includes:

a receiving unit 1601, adapted to receive a Trigger message sent by the server;

a generating unit 1602, adapted to: use a server nonce to authenticate the Trigger message after receiving the Trigger message; if the authentication fails, use the default nonce to authenticate the Trigger message; after the authentication succeeds, use a client nonce to generate a session request and send the session request to the server so that the server can use the client nonce to authenticate the client; and a password changing unit 1603, adapted to change the server password and the client password after updating the server nonce with the new server nonce.

The operation mode of the client provided in Embodiment 2 is similar to the operation mode of the client in the authentication method provided in the seventh and eighth embodiments of the present invention, and is not repeated here any further.

Through the client provided in Embodiment 2 of the present invention, when the s_nonce needs to be updated, only the s_nonce is updated, and the c_nonce is not updated. Even if the system uses the default nonce for authentication when handling the s_nonce error, because the c_nonce does not need to be updated, the client can use the c_nonce to generate a session request, thus receiving the frequency of using the default nonce and enhancing the system security.

Figure 17:
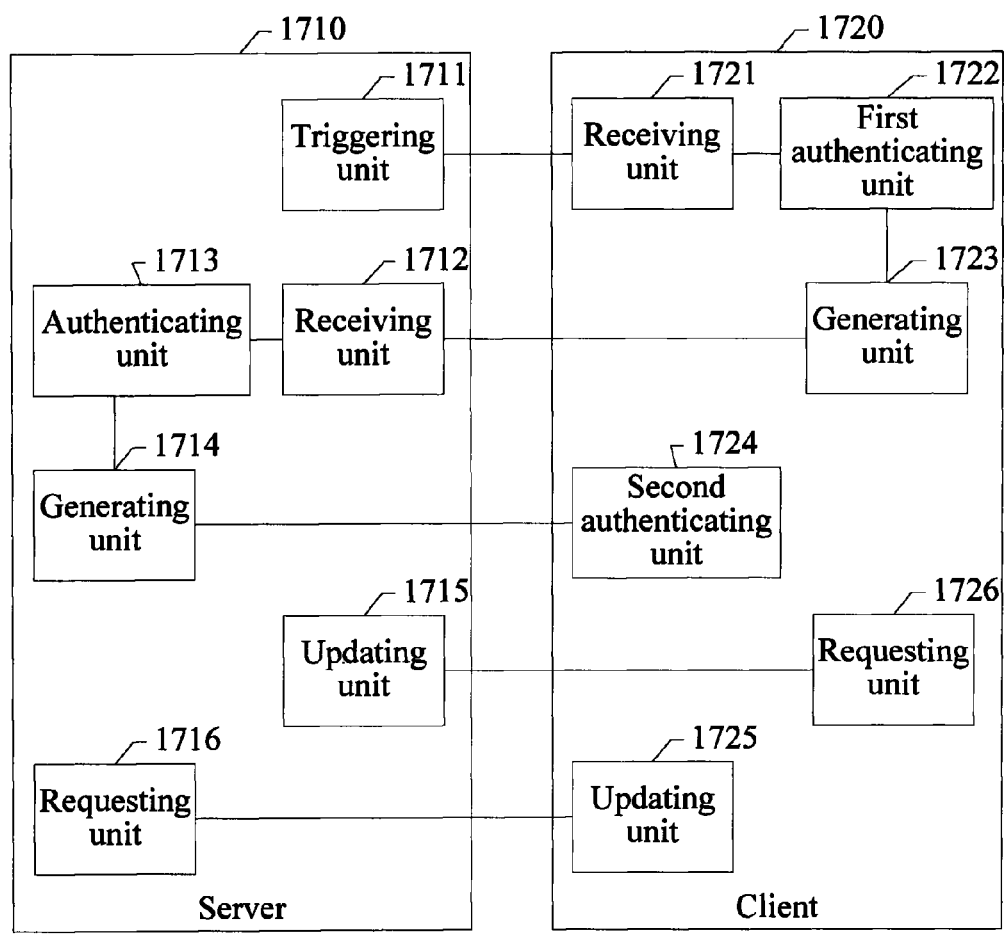
FIG. 17 shows a structure of an authentication system in Embodiment 2 of the present invention.

As shown in FIG. 17, an authentication system provided in Embodiment 2 of the present invention includes a sever 1710 and a client 1720.

The server 1710 further includes:

a triggering unit 1711, adapted to: use a nonce shared by the server and the client to generate a Trigger message, and send the Trigger message to the client so that the client can use the shared nonce to authenticate the Trigger message after receiving the Trigger message;

a receiving unit 1712, adapted to receive the session request generated by using the shared nonce from the client;

an authenticating unit 1713, adapted to authenticate the session request by using the shared nonce;

a generating unit 1714, adapted to: use a shared nonce to generate a response after the session request is authenticated successfully, and send the response to the client so that the client can use the shared nonce to authenticate the response after receiving the response;

an updating unit 1715, adapted to: generate a shared nonce; when the shared nonce needs to be updated, generate a new shared nonce, and send a nonce update message that carries the new shared nonce to the client so that the client can use the new shared nonce to update the shared nonce after receiving the nonce update message; and a requesting unit 1716, adapted to: when determining that the shared nonce needs to be updated, send a nonce update request to the client so that the client can generate a new shared nonce after receiving the nonce update request and deciding to update the nonce and send a nonce update message that carries the new shared nonce.

The client 1720 further includes:

a receiving unit 1721, adapted to receive the Trigger message that is sent by the server and generated by using the nonce shared by the server and the client;

a first authenticating unit 1722, adapted to authenticate the Trigger message by using the shared nonce after receiving the Trigger message;

a generating unit 1723, adapted to: use a shared nonce to generate a session request after the authentication succeeds, and send the session request to the server so that the server can use the shared nonce to authenticate the session request after receiving the session request, namely, verify validity of the session request;

a second authenticating unit 1724, adapted to use the shared nonce to authenticate the response after receiving the response generated by the server by using the shared nonce;

an updating unit 1725, adapted to: generate a shared nonce; when the shared nonce needs to be updated, generate a new shared nonce, and send a nonce update message that carries the new shared nonce to the server so that the server can use the new shared nonce to update the shared nonce after receiving the nonce update message; and a requesting unit 1726, adapted to: when determining that the shared nonce needs to be updated, send a nonce update request to the server so that the server can generate a new shared nonce after receiving the nonce update request and deciding to update the nonce and send a nonce update message that carries the new shared nonce.

The operation mode of the authentication system in Embodiment 2 is similar to the operation mode of the authentication method in Embodiment 9 of the present invention, and is not repeated here any further.

Through the authentication system provided in Embodiment 2 of the present invention, the server and the client share a nonce in the session process in place of the s_nonce and the c_nonce in the prior art to implement the authentication between the client and the server, thus relieving the system load effectively.

The server provided in Embodiment 2 of the present invention and the client provided in Embodiment 3 of the present invention are basically the same as the server and the client in the authentication system provided in Embodiment 2 of the present invention, and are not repeated here any further.

It is understandable to those skilled in the art that all or part of the steps of the foregoing embodiments may be implemented by hardware instructed by a computer program. The program may be stored in a computer-readable storage medium. The storage medium may be a Read-Only Memory (ROM), magnetic disk, or Compact Disk (CD).

Elaborated above are an authentication method based on a DS protocol or a DM protocol, a system, a server, and a client under the present invention. Although the invention is described through some exemplary embodiments, the invention is not limited to such embodiments. It is apparent that those skilled in the art can make modifications and variations to the invention without departing from the spirit and scope of the invention. The invention shall cover the modifications and variations provided that they fall in the scope of protection defined by the following claims or their equivalents.

What is claimed is:

1. In a client device configured to establish a session with a server, a method for establishing the session when the server requests the client to initiate the session using a Trigger message, the method comprising:

receiving a Trigger message from a server that includes a session ID identifying a session to be triggered, a system time of the server and a first digest;

determining that a difference between a local time of the client and the system time of the server is within a predetermined threshold;

calculating a second digest using the system time of the server;

authenticating the first digest carried in the Trigger message by comparing the first digest and the second digest; and based on the authentication, sending a session request including the session ID carried in the Trigger message to the server.

2. The method of claim 1, wherein the session request carries authentication information, which includes a Digest generated using a client nonce.

3. A client device configured to establish a session with a server, comprising a receiver, a transmitter, a processor and computer executable instructions stored on a non-transitory computer readable storage medium, wherein:

the receiver is configured to receive a Trigger message from a server that includes a session ID identifying a session to be triggered, a system time of a server and a first digest;

the computer executable instructions stored on a non-transitory computer readable storage medium are configured such that, when executed by the processor, cause the client device to, determine that a difference between a local time of the client and the system time of the server is within a predetermined threshold, calculate a second digest using the system time of the server, and authenticate the first digest carried in the Trigger message by comparing the first digest and the second digest; and the transmitter is configured to send a session request including the session ID carried in the Trigger message to the server based on the authentication.

4. The client device of claim 3, wherein the session request carries authentication information including a Digest generated using a client nonce.

* * * * *